US012634761B2

(12) United States Patent     (10) Patent No.:    US 12,634,761 B2

Jang et al.       (45) Date of Patent:     May 19, 2026

(54) METHOD AND APPARATUS FOR PERFORMING SENSING IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 458 days.

(21) Appl. No.: 18/034,003

(22) PCT Filed: Oct. 15, 2021

(86) PCT No.: PCT/KR2021/014397

§ 371 (c)(1),
(2) Date: Oct. 2, 2023

(87) PCT Pub. No.: WO2022/092650

PCT Pub. Date: May 5, 2022

(65) Prior Publication Data

US 2024/0276303 A1     Aug. 15, 2024

Related U.S. Application Data

(60) Provisional application No. 63/219,334, filed on Jul. 7, 2021, provisional application No. 63/111,088, filed
(Continued)

(51) Int. Cl.
    *H04W 28/18*     (2009.01)
    *H04W 84/12*     (2009.01)

(52) U.S. Cl.
    CPC ............ *H04W 28/18* (2013.01); *H04W 84/12* (2013.01)

(58) Field of Classification Search
    CPC ..... H04W 28/18; H04W 84/12; H04W 24/10; H04W 24/08; G01S 7/006; G01S 13/003;
(Continued)

(56) References Cited

U.S. PATENT DOCUMENTS

2016/0066195 A1    3/2016   Moon et al.
2018/0343580 A1    11/2018   Xiang et al.
(Continued)

FOREIGN PATENT DOCUMENTS

EP      3582533 A    12/2019
KR    20140109899    9/2014
KR    20160087743    7/2016

OTHER PUBLICATIONS

Chen et al "Overview of WLAN sensing protocol", IEEE 802.11-20/1232r0, date: Aug. 16, 2020 (Year: 2020).*
(Continued)

*Primary Examiner* — Sun Jong Kim
(74) *Attorney, Agent, or Firm* — BRYAN CAVE LEIGHTON PAISNER LLP

(57)          ABSTRACT

Proposed are a method and apparatus for performing sensing in a wireless LAN system. Specifically, a first STA transmits a sensing request frame to a second STA. The first STA receives a first sensing response frame form the second STA. The first STA transmits a sensing signal to the second STA or receives the sensing signal from the second STA. The sensing request frame includes a transmission parameter set, a measurement and feedback parameter set, and a transmission method of the sensing signal. The sensing response frame includes a first indicator indicating whether to use at least one transmission parameter included in the transmis-
(Continued)

Phase

Setup

Negotiation

Sensing

Tear Down

Negotiation/Tear down phases may or may not exist sion parameter set and a second indicator indicating whether to use at least one measurement and feedback parameter included in the measurement and feedback parameter set.

14 Claims, 24 Drawing Sheets

Related U.S. Application Data on Nov. 9, 2020, provisional application No. 63/108,440, filed on Nov. 2, 2020, provisional application No. 63/107,434, filed on Oct. 30, 2020.

(58) Field of Classification Search
CPC ..... H04L 63/00; H04L 1/0026; H04L 1/0029; H04L 69/24
See application file for complete search history.

(56) References Cited

U.S. PATENT DOCUMENTS

| | | | | |
|---|---|---|---|---|
| 2021/0288779 | A1* | 9/2021 | Da Silva | H04W 72/0473 |
| 2022/0030611 | A1* | 1/2022 | Oteri | H04B 7/024 |
| 2022/0338063 | A1* | 10/2022 | Han | H04L 5/0094 |

OTHER PUBLICATIONS

Intel, "Overview of WLAN sensing protocol," IEEE 802.11-20/1232r0, Aug. 16, 2020.
Intel, "WLAN Sensing Definitions," IEEE 802.11-20/0807r3, Jun. 23, 2020.
LG Electronics, "Use Cases for Wireless Lan Sensing," IEEE 802.11-20/1239r0, Aug. 17, 2020.

* cited by examiner (a)

(b)

———▶ : Sensing PPDU transmission

Sensing Initiator
Sensing Receiver

STA5

STA1          STA2          STA3          STA4

Sensing Responders
Sensing Transmitters

⟶ : Sensing PPDU transmission
----➤ : Sensing feedback transmission

Sensing Initiator
Sensing Transmitter

STA5

STA1   STA2   STA3   STA4

Sensing Responders
Sensing Receivers

Sensing & Measurement

METHOD AND APPARATUS FOR PERFORMING SENSING IN WIRELESS LAN SYSTEM

CROSS-REFERENCE TO RELATED APPLICATIONS

This application is the National Stage filing under 35 U.S.C. 371 of International Application No. PCT/KR2021/014397, filed on Oct. 15, 2021, which claims the benefit of U.S. Patent Application No. 63/107,434 filed on Oct. 30, 2020, U.S. Patent Application No. 63/108,440 filed on Nov. 2, 2020, U.S. Patent Application No. 63/111,088 filed on Nov. 9, 2020, and U.S. Patent Application No. 63/219,334 filed on Jul. 7, 2021, the contents of which are all hereby incorporated by reference herein in their entirety.

TECHNICAL FIELD

The present specification relates to a technique for performing sensing in a wireless LAN system, and more particularly, to a method and an apparatus for performing a sensing procedure by negotiating an STA to participate in sensing and parameters to be used for sensing.

BACKGROUND

A wireless local area network (WLAN) has been improved in various ways. For example, IEEE 802.11bf wireless LAN sensing is the first standard that converges communications and radar technologies. Although the demand for unlicensed spectrum is rapidly increasing in everyday life and industry, there is a limit to the new spectrum supply. Therefore, the development of convergence technology between communication and radar is a very desirable direction in terms of increasing frequency utilization efficiency. Sensing technology that detects movement behind a wall using a wireless LAN signal or a radar technology that detects movement in a vehicle using a Frequency Modulated Continuous Wave (FMCW) signal in the 70 GHz band is being developed. It can be of great significance in that it can raise the sensing performance to one level by linking it. In particular, as the importance of privacy protection is increasingly emphasized in modern society, the development of wireless LAN sensing technology that is legally free from the issue of privacy infringement is more expected than CCTV.

Meanwhile, the overall radar market across automobiles, defense, industry, and life is expected to grow at a compound annual growth rate (CAGR) of about 5% by 2025, and in particular, in the case of living sensors, the CAGR is expected to grow rapidly to 70% . . . . Wireless LAN sensing technology can be applied to a wide range of real-life applications such as motion detection, breathing monitoring, positioning/tracking, fall detection, in-vehicle infant detection, appearance/proximity recognition, personal identification, body motion recognition, and behavior recognition, thereby promoting the growth of related new businesses and It is expected to contribute to enhancing the competitiveness of the company.

SUMMARY

The present specification proposes a method and an apparatus for performing sensing in a wireless LAN system. An example of the present specification proposes a method for performing sensing.

This embodiment may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

This embodiment is performed in a first STA, and the first STA may correspond to a sensing initiator. The second and third STAs of this embodiment may correspond to sensing responders.

This embodiment proposes a method for determining STAs to participate in sensing in a WLAN system, negotiating parameters to be used for sensing, and performing a sensing procedure based on the negotiated parameters. In particular, this embodiment proposes a method of performing a sensing procedure based on role negotiation, parameter negotiation in the negotiation step, and selected parameters.

A first station (STA) transmits a sensing request frame to a second STA.

The first STA receives a sensing response frame from the second STA.

The first STA transmits a sensing signal to the second STA or receives a sensing signal from the second STA.

The sensing request frame includes a transmission method of the sensing signal, a transmission parameter set, and a measurement and feedback parameter set. The sensing response frame includes a first indicator for whether or not at least one transmission parameter included in the transmission parameter set is used, and a second indicator indicating whether at least one measurement and feedback parameter included in the measurement and feedback parameter set is used. For example, the second STA may indicate through the sensing response frame that two transmission parameters may be used in the transmission parameter set, and may indicate that three measurement and feedback parameters may be used in the measurement and feedback parameter set.

According to the embodiment proposed in this specification, a new effect of performing a sensing procedure based on various parameter sets after the negotiation step while minimizing overhead between sensing STAs can be obtained.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features that are individually described in one drawing in this specification may be implemented individually or simultaneously.

The following examples of the present specification may be applied to various wireless communication systems. For example, the following example of the present specification may be applied to a wireless local area network (WLAN) system. For example, the present specification may be applied to the IEEE 802.11ad standard or the IEEE 802.1 lay standard. In addition, the present specification may be applied to a newly proposed wireless LAN sensing standard or IEEE 802.11bf standard.

Hereinafter, technical features to which the present specification can be applied in order to describe the technical features of the present specification will be described.

Figure 1:
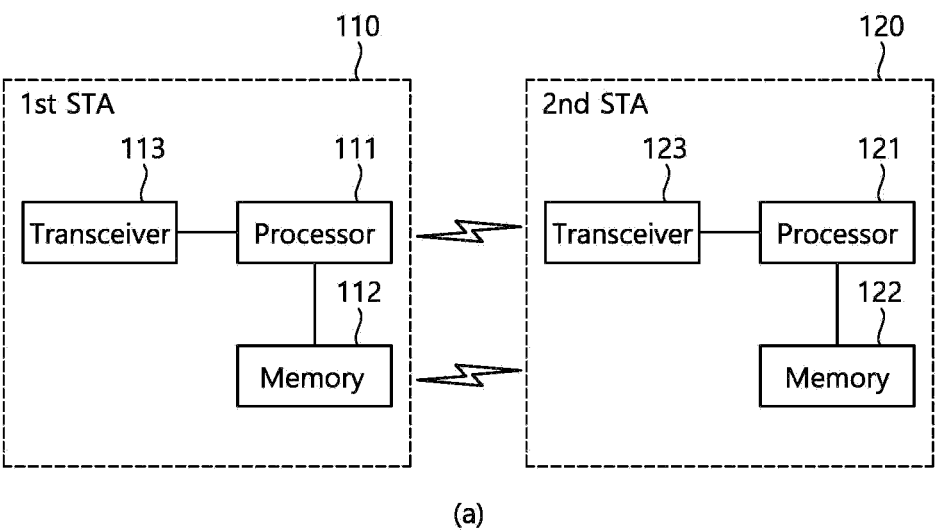
FIG. 1(a) and FIG. 1(b) show an example of a transmitting apparatus and/or receiving apparatus of the present specification.
Figure 1:
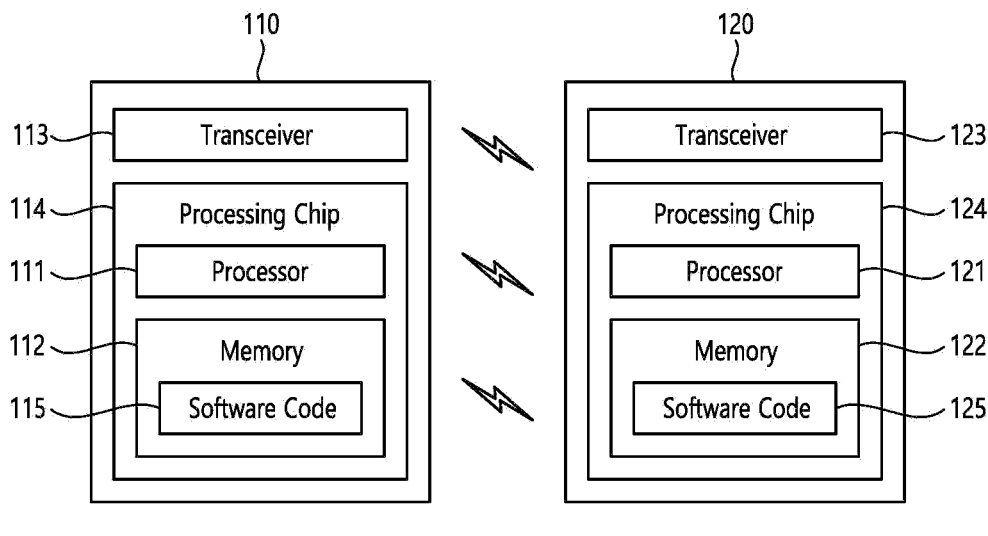

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU: 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU: 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below; may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Wireless LAN sensing technology is a kind of radar technology that can be implemented without standards, but it is judged that stronger performance can be obtained through standardization. The IEEE 802.11bf standard defines devices participating in WLAN sensing by function as shown in the table below. According to its function, it can be divided into a device that initiates wireless LAN sensing and a device that participates, and a device that transmits and receives a sensing PPDU (Physical Layer Protocol Data Unit).

TABLE 1

| Term | Function |
| --- | --- |
| Sensing Initiator | A device that initiates sensing |
| Sensing Responder | A device that participates in sensing |
| Sensing Transmitter | A device that transmits a sensing PPDU |
| Sensing Receiver | A device that receives a sensing PPDU |

Figure 2:
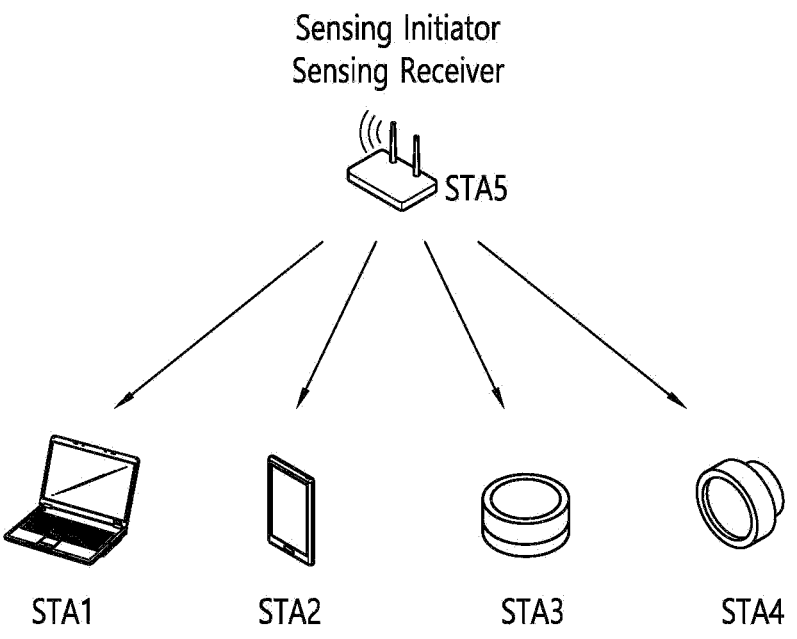
FIG. 2 shows an example of a wireless LAN sensing scenario using a multi-sensing transmitting device.

FIG. 2 shows an example of a wireless LAN sensing scenario using a multi-sensing transmitting device.

Figure 3:
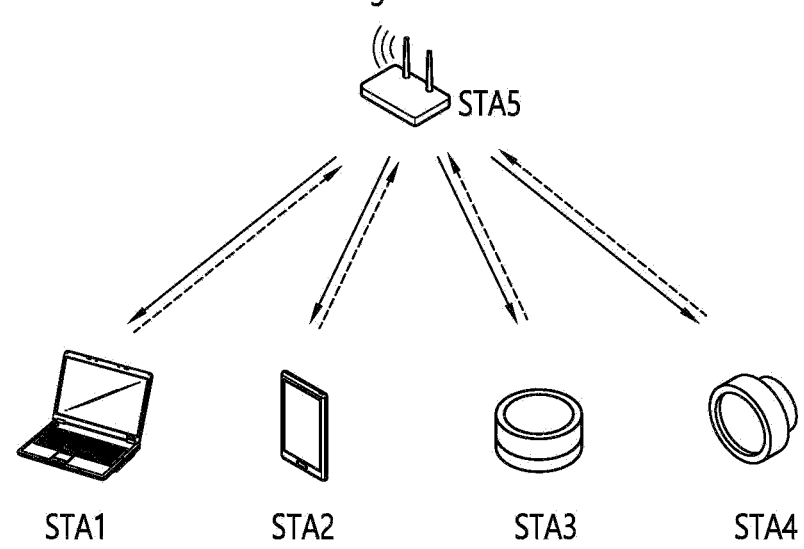
FIG. 3 shows an example of a wireless LAN sensing scenario using a multi-sensing receiving device.

FIG. 3 shows an example of a wireless LAN sensing scenario using a multi-sensing receiving device.

FIGS. 2 and 3 show sensing scenarios according to the function and arrangement of a wireless LAN sensing device. In an environment assuming one sensing start device and multiple sensing participating devices, FIG. 2 is a scenario using multiple sensing PPDU transmitting devices, and FIG. 3 is a scenario using multiple sensing PPDU receiving devices. Assuming that the sensing PPDU receiving device includes the sensing measurement signal processing device, in the case of FIG. 3, a procedure for transmitting (feedback) the sensing measurement result to the sensing initiate device (STA 5) is additionally required.

Figure 4:
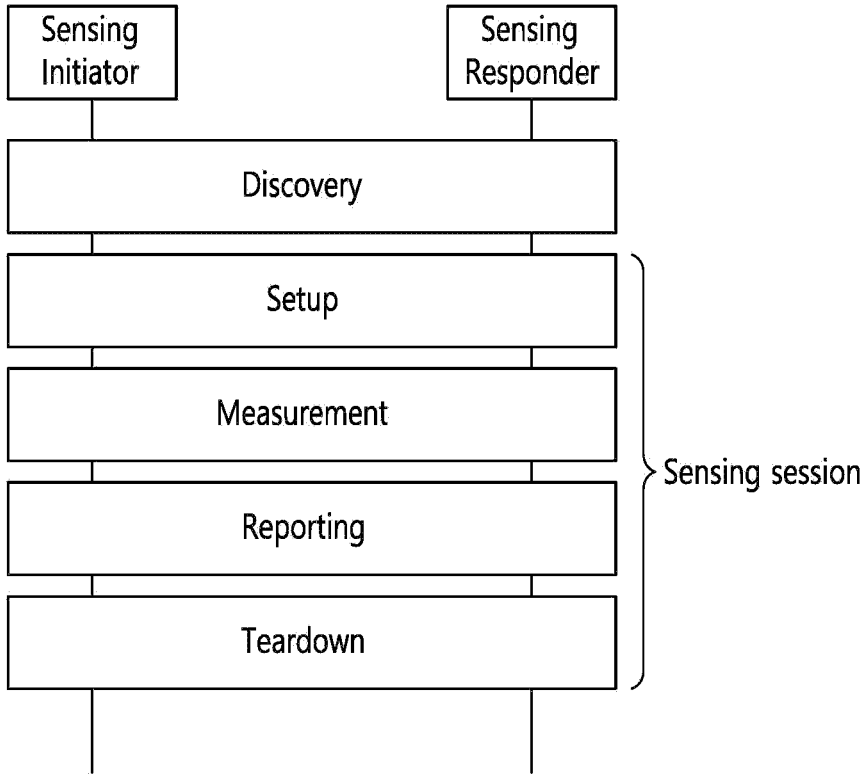
FIG. 4 shows an example of a wireless LAN sensing procedure.

FIG. 4 shows an example of a wireless LAN sensing procedure.

Looking at the procedure of wireless LAN sensing, discovery, negotiation, measurement exchange, and tear down are performed between the wireless LAN sensing initiate device and the participating device. Discovery is a process of identifying the sensing capabilities of WLAN devices, negotiation is a process of determining a sensing parameter between a sensing initiate device and a participating device, and measurement value exchange is a process of transmitting a sensing PPDU and transmitting a sensing measurement result, and connecting release is the process of terminating the sensing procedure.

Figure 5:
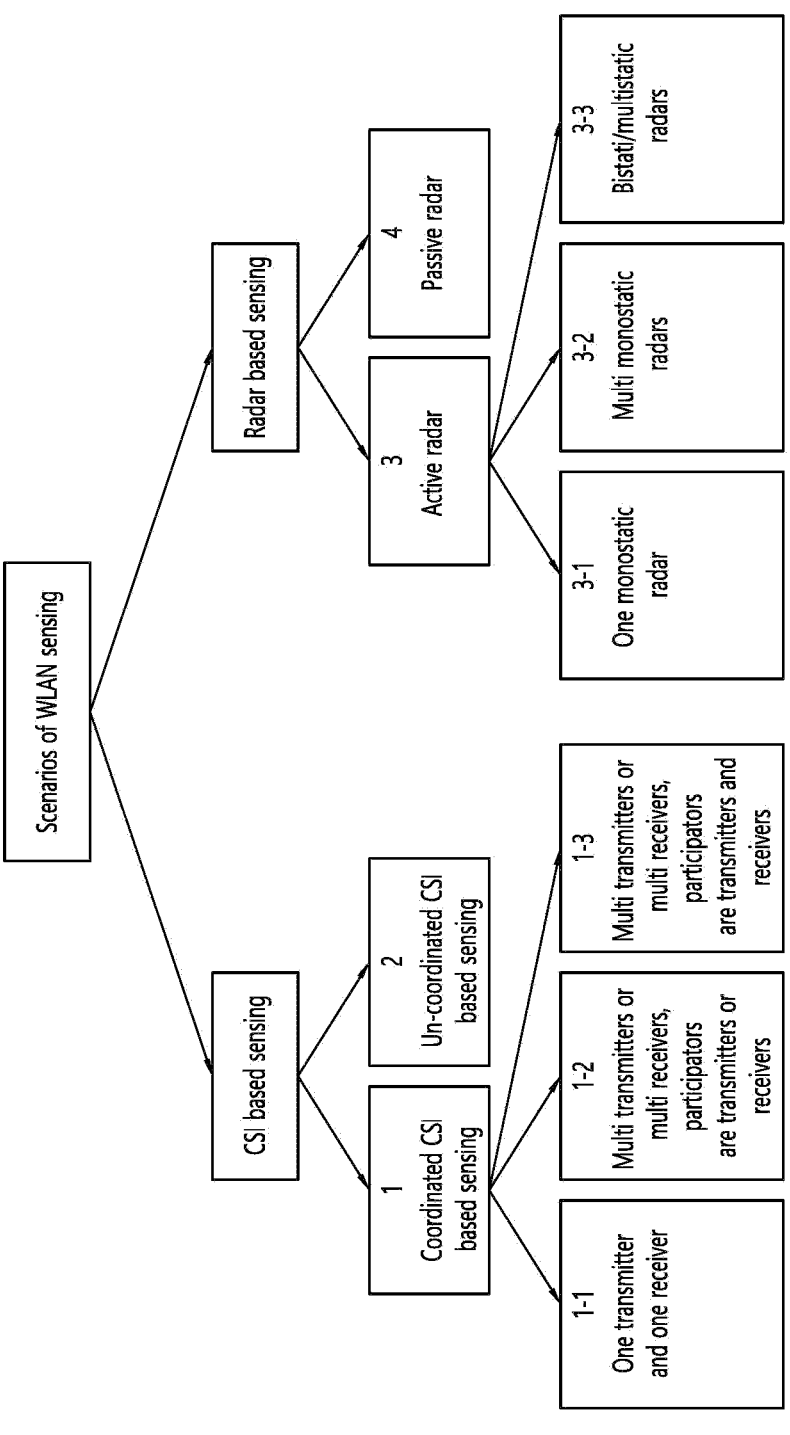
FIG. 5 is an example of classification of wireless LAN sensing.

FIG. 5 is an example of classification of wireless LAN sensing.

Wireless LAN sensing can be classified as "CSI-based sensing that uses channel state information of a signal that arrives at a receiver through a channel from a transmitter" and "Radar-based sensing that uses a signal received after a transmitted signal is reflected by an object". In addition, each sensing technology includes a method in which a sensing transmitter directly participates in the sensing process (coordinated CSI, active radar) and a method in which the sensing transmitter does not participate in the sensing process, that is, there is no dedicated transmitter participating in the sensing process (un-coordinated CSI, passive radar).

Figure 6:
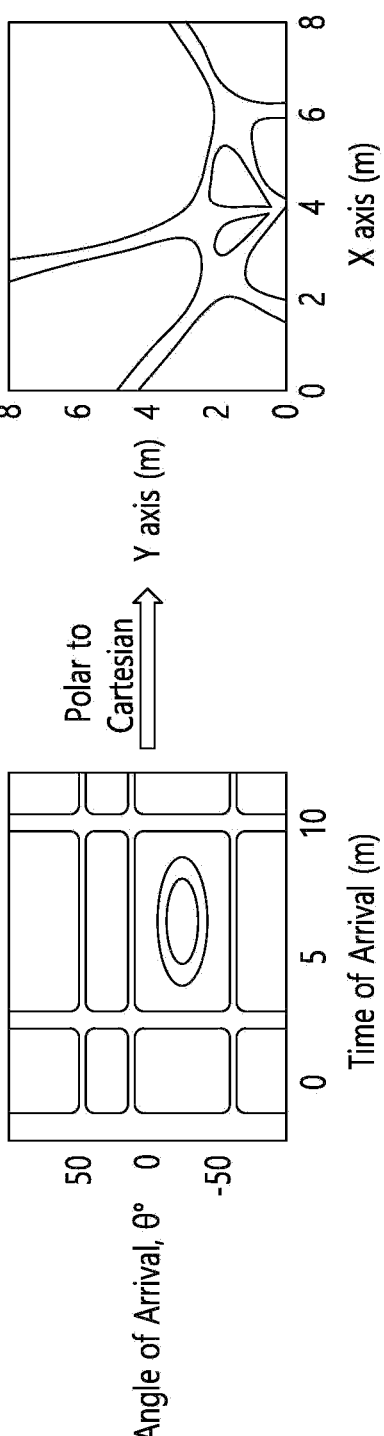
FIG. 6 shows indoor positioning using CSI-based WLAN sensing.

FIG. 6 shows indoor positioning using CSI-based WLAN sensing.

FIG. 6 shows that CSI-based wireless LAN sensing is used for indoor positioning. The sensing device may obtain indoor positioning information by obtaining an angle of arrival and a time of arrival by using the CSI and converting these into orthogonal coordinates.

Figure 7:
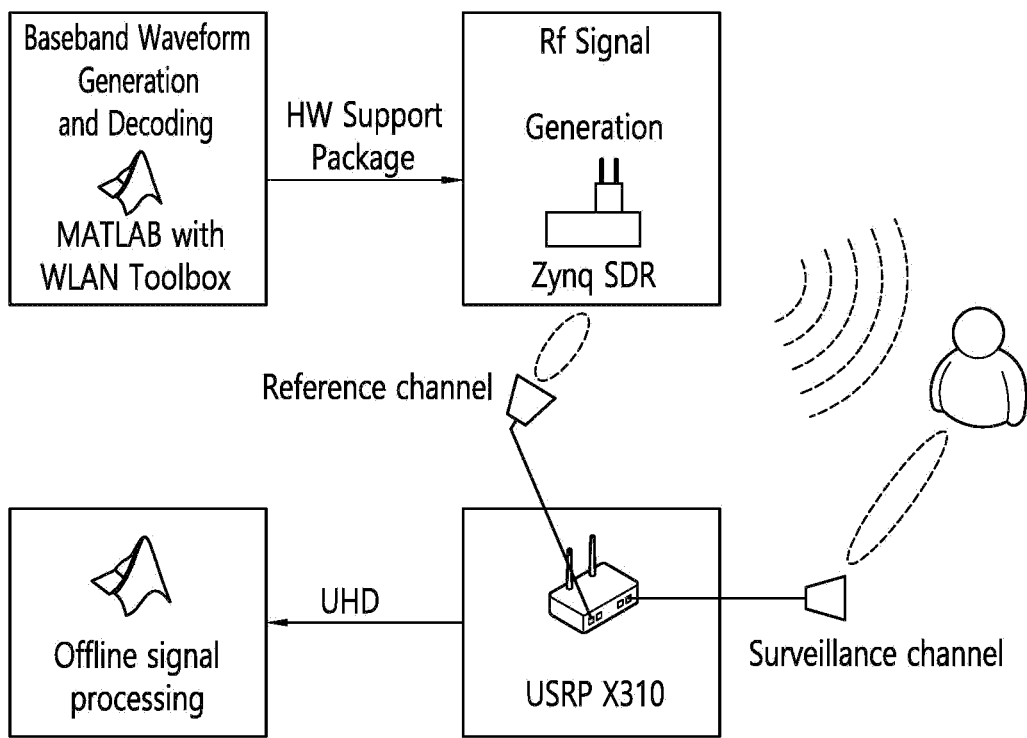
FIG. 7 is an example of an implementation of a wireless LAN sensing device.

FIG. 7 is an example of an implementation of a wireless LAN sensing device.

FIG. 7 is an implementation of a wireless LAN sensing device using MATLAB Toolbox, Zynq, and USRP. An IEEE 802.11ax wireless LAN signal is generated in the MATLAB toolbox, and an RF signal is generated using Zynq Software Defined Radio (SDR). The signal passing through the channel is received by USRP SDR and the sensing signal processing is performed in the MATLAB toolbox. Here, one reference channel (a channel that can be directly received from a sensing transmitter) and one surveillance channel (a channel that can be received by being reflected by an object) are assumed. As a result of analysis using a wireless LAN sensing device, a unique characteristic that can distinguish movement or body movement was obtained.

Currently, IEEE 802.11bf wireless LAN sensing standardization is in the initial development stage, and cooperative sensing technology to improve sensing accuracy will be treated as important in the future. It is expected that the synchronization technology of sensing signals for cooperative sensing. CSI management and use technology, sensing parameter negotiation and sharing technology, and scheduling technology for CSI generation will be the key topics for standardization. In addition, long-distance sensing technology, low-power sensing technology, sensing security and privacy protection technology will also be considered as major agenda items.

IEEE 802.11bf wireless LAN sensing is a kind of radar technology that uses a wireless LAN signal that is commonly present anytime, anywhere. The table below shows typical IEEE 802.11bf use cases, which can be used in a wide range of real-life situations, such as indoor sensing, motion recognition, health care, 3D vision, and in-vehicle sensing. Because it is mainly used indoors, the operating range is usually within 10 to 20 meters, and the distance accuracy does not exceed 2 meters at most.

TABLE 2

| Name | details | Max range (m) | Key Performance Indicator | Range Accuracy (m) | Max Velocity (m/s)/ Velocity Accuracy | angular Accuracy (deg) |
|---|---|---|---|---|---|---|
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |

TABLE 2-continued

| Name | details | Max range (m) | Key Performance Indicator | Range Accuracy (m) | Max Velocity (m/s)/ Velocity Accuracy | angular Accuracy (deg) |
|---|---|---|---|---|---|---|
| Health case - remote diagnostics | measurements of breathing rate, heart rate etc. | 5 | Breathing rate accuracy/ Pulse Accuracy | 0.5 | 2/0.1 | |
| Surveillance/ Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3 d vision | building a 3 d picture of an environment, using multiple STA | 10 | accuracy of 3 d map (range, angle) | 0.01 | 5/0.1 | 2 |
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

Figure 8:
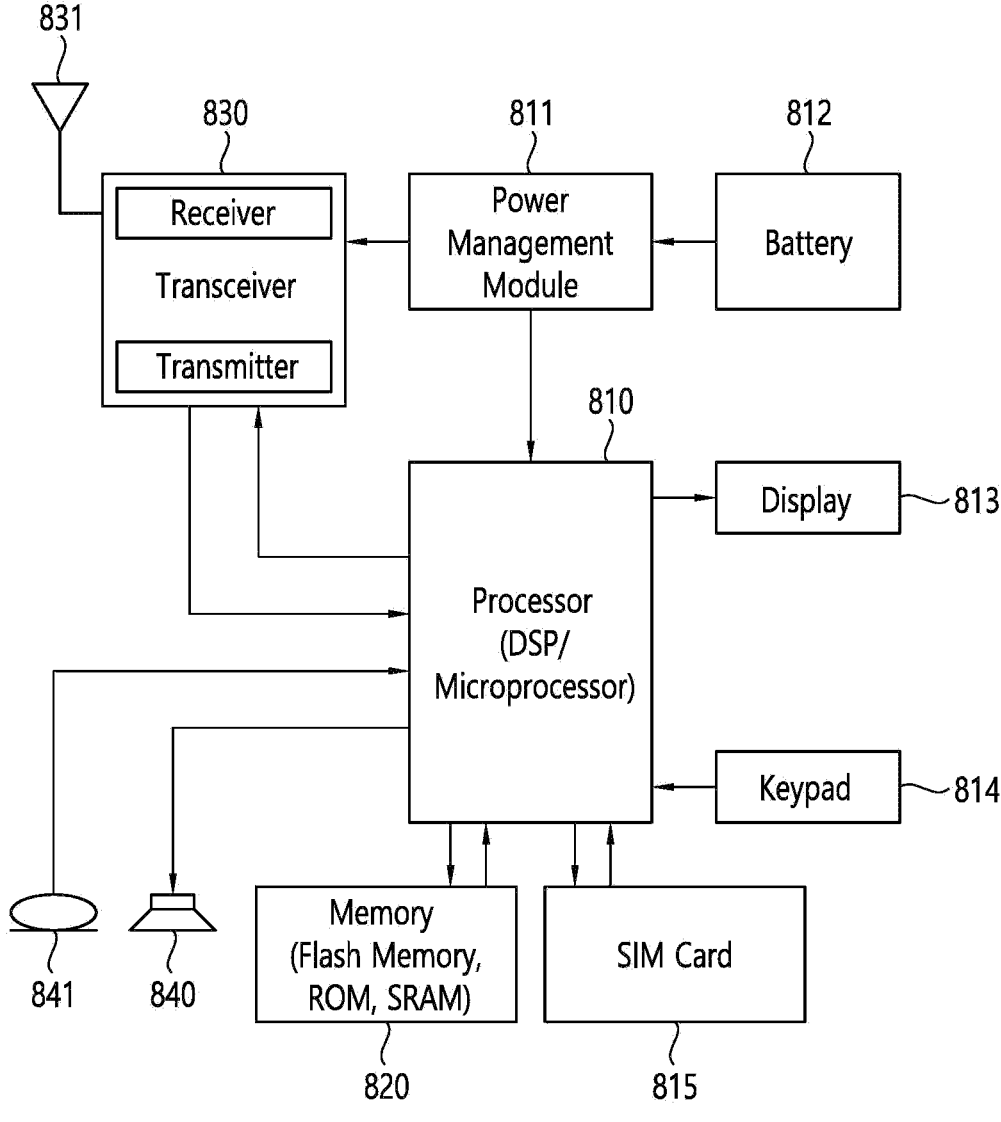
FIG. 8 illustrates an example of a modified transmission device and/or receiving device of the present specification.

FIG. 8 illustrates an example of a modified transmission device and/or receiving device of the present specification.

Each device/STA of the sub-figure (a)/(b) of FIG. 1 may be modified as shown in FIG. 8. A transceiver 630 of FIG. 8 may be identical to the transceivers 113 and 123 of FIG. 1. The transceiver 630 of FIG. 8 may include a receiver and a transmitter.

A processor 610 of FIG. 8 may be identical to the processors 111 and 121 of FIG. 1. Alternatively, the processor 610 of FIG. 8 may be identical to the processing chips 114 and 124 of FIG. 1.

A memory 620 of FIG. 8 may be identical to the memories 112 and 122 of FIG. 1. Alternatively, the memory 620 of FIG. 8 may be a separate external memory different from the memories 112 and 122 of FIG. 1.

Referring to FIG. 8, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 8, a speaker 640 may output a result related to a sound processed by the processor 610. A microphone 641 may receive an input related to a sound to be used by the processor 610.

11SENS uses 60 GHz Wi-Fi signal to sense the motion or gesture of an STA or a person, so 802.11ad and 802.11ay, which are 60 GHz Wi-Fi technologies, are being considered. In this specification, for efficient Wi-Fi sensing, a method for configuring a sensing start frame, a transmission start frame, and a sensing signal for channel estimation between an AP and an STA or between STAs, and a sensing sequence for transmitting and receiving a sensing start frame, a transmission start frame, and a sensing signal are proposed.

The STA described below may be the device of FIGS. 1 and/or 8. A device may be an AP or a non-AP STA.

WLAN (Wireless Local Area Network) was introduced for the purpose of short-distance data transmission using an unlicensed band. IEEE 802.11 MAC/PHY-based WLAN (e.g., Wi-Fi) has become a representative technology to the extent that it is currently deployed almost everywhere.

WLAN (e.g., Wi-Fi) was designed for transmission of data signals, but its use has recently been expanded for purposes other than data transmission.

A WLAN (e.g., Wi-Fi) signal transmitted from a transmitting end to a receiving end may include information about a transmission channel environment between the two transmitting and receiving ends. WLAN sensing refers to a technology for obtaining cognitive information on various surrounding environments by processing information on a transmission channel environment obtained through a WLAN signal.

For example, cognitive information includes information obtained through technology such as gesture recognition, fall detection by elder people, intrusion detection, human motion detection, health monitoring, and pet movement detection.

Additional services can be provided through cognitive information, and WLAN sensing can be applied and used in various forms in real life. As a method for increasing the accuracy of WLAN sensing, devices having one or more WLAN sensing functions can be used for WLAN sensing. WLAN sensing using multiple devices can use multiple pieces of information about the channel environment compared to the method using one device (i.e., transmitting/ receiving end), so more accurate sensing information can be obtained.

WLAN (e.g., Wi-Fi) transmission is performed in a broadband using channel aggregation, channel bonding, and the like. In addition, WLAN transmission in a more extended broadband is being discussed.

Recently, interest in WLAN devices that perform sensing using WLAN signals is increasing, and IEEE 802.11 is discussing by forming a Study Group. WLAN sensing can include various scenarios.

Figure 9:
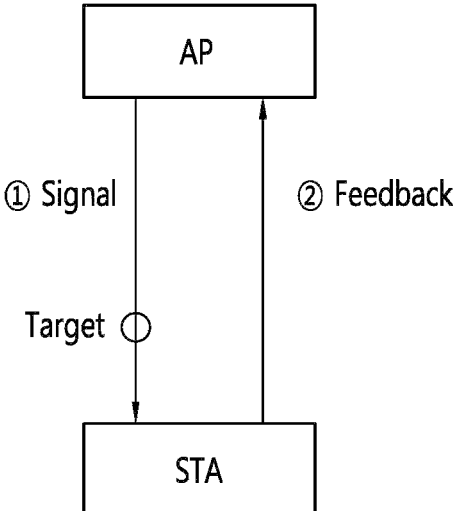
FIG. 9 shows an example of WLAN sensing.

FIG. 9 shows an example of WLAN sensing.

Referring to FIG. 9, a target to be sensed may exist and STAs sensing the target may exist. For example, an AP and an STA may perform sensing. A target may exist between the AP and the STA. For example, an AP may transmit a sensing signal to an STA, and the STA may transmit a feedback signal for the sensing signal to the AP. That is, the AP transmits a signal to identify the sensing target, and the STA can receive and measure a signal affected by the target. The STA transmits the measured result to the AP, and the AP can identify a target based on the measured result.

Figure 10:
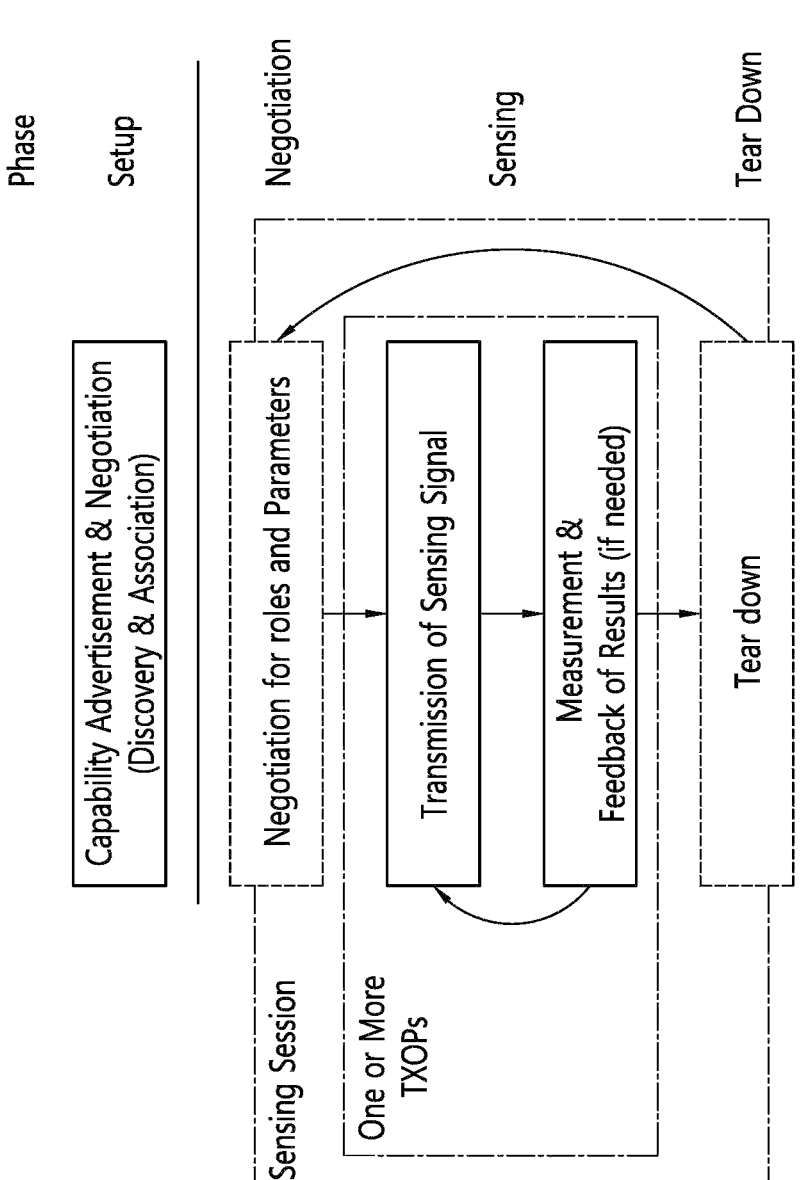
FIG. 10 is a flowchart illustrating a procedure of WLAN sensing.

Basically; steps as shown in FIG. 10 may be performed for WLAN sensing.

FIG. 10 is a flowchart illustrating a procedure of WLAN sensing.

1) Setup Phase (Capability Advertisement & Negotiation): A phase of exchanging sensing-related capabilities and forming an association. Through this process, STAs can perform association by determining whether sensing is possible and whether they have appropriate sensing capabilities. The Setup Phase may also be named Discovery & Association Phase.

2) Negotiation Phase (grouping may also be included if necessary): Negotiation is performed for each STA's role related to sensing and parameters to be used during sensing. Using these negotiated roles and parameters, these negotiated roles/parameters can be used in multiple sensing sessions before tear-down. The Negotiation Phase may also be named a Setup Phase.

3) Sensing Phase (Measurement and Feedback/Reporting performed during sensing session): It means the phase of transmitting sensing signal to identify target and receiving and measuring the signal that passed through target. One cycle of this step can be defined as a sensing session.

4) Tear down: The STA resets the negotiated role and parameters, and may go through a negotiation process to start the sensing session again.

In this specification, the role of Sensing STA is defined as follows.

Sensing initiator: STA initiating a WLAN sensing session

Sensing responder: STA participating in the WLAN sensing session initiated by the sensing initiator Sensing transmitter: STA that transmits a PPDU used for sensing measurements in a sensing session Sensing receiver: STA that receives the PPDU transmitted by the sensing transmitter and performs sensing measurement In this specification, the focus is on the negotiation phase and the sensing phase, and the operation in the sensing phase may vary according to the negotiation phase.

A designation (or name) in this specification may be changed, and the STA may include an AP STA or a non-AP STA. In addition, an STA capable of sensing is referred to as a SENS STA. In addition, an STA capable of sensing is referred to as a SENS STA. In addition, a sensing session is defined as a SENS STA performing sensing using negotiated roles and parameters, during this sensing session, WLAN sensing operation (that is, channel measurement and feedback) can be performed between SENS STAs through several TXOPs.

Operation in the sensing phase can be determined by the following criteria, but it is not always limited to the criteria below: The sensing signal mentioned below refers to a signal for the purpose of measuring a channel, such as the previously used Null Data PPDU (NDP), but may also be a transmission signal such as a dummy signal or sequence. SENS STA may use a new type of signal as a sensing signal other than NDP.

Method to Transmit: How will the sensing signal be transmitted?

Transmission Parameter (Transmit Parameter): Which transmission parameter is applied to transmit the sensing signal according to the transmission method?

Measurement/Feedback related parameters: How to measure the transmitted sensing signal according to the transmission method and how to transmit the feedback?

1) Transmission Method

Basically, the transmission method can be divided into an explicit method and an implicit method.

1-1) Explicit method: A method of requesting (or initiating) transmission of a sensing signal by one STA (e.g., sensing initiator)

1-2) Implicit method: A method of transmitting a sensing signal without request (or initiation) by one STA 2) Transmission Parameter Basically, the possible transmission parameters are as follows, but are not limited thereto. Some or all of the transmission parameters described below may be indicated. For example, some parameters may or may not be included depending on the explicit method and the implicit method. The indicated parameters can be viewed as one set, which is referred to as a transmit parameter set.

2-1) Number of used antennas (or spatial streams): The number of antennas or spatial streams for transmitting sensing signals 2-2) Signal Type: Sensing signal type. There can be various signal types. For example, NDP transmission after NDP Announcement (NDPA) frame (i.e., NDPA+ NDP), only NDP transmission, new signal transmission after announcement frame for new signal type, transmission of only new signal, etc.

2-3) Signal Length: Transmission time or length of sensing signal 2-4) Measurable Bandwidth: maximum bandwidth for sensing signal. For example, even if the frame received before the sensing signal is 80 MHz, if this parameter is set to 40 MHz, it can be transmitted at 40 MHz. That is, when obtaining TXOP, it can be transmitted by reducing the transmission bandwidth of the first frame.

2-6) Number of Sensing Signals: Since sensing signal transmission may perform sensing through multiple transmissions in succession rather than one shot, an instruction on how many times to transmit may be required. For example, it may be information about how many times to transmit NDP at SIFS intervals.

2-7) Sensing period (SP) related parameter: In the case of using only the implicit method, the sensing transmitter can transmit the sensing signal without a special request from the sensing initiator STA. Therefore, parameters related to the sensing period can be defined. For example, a starting point of a sensing period (e.g., a time difference from the next beacon), a length of a sensing period, a time interval between sensing periods, and the like can be defined as related parameters. These sensing period parameters need not necessarily be included in the transmit parameter set.

3) Measurement/Feedback Related Parameters

Basically, the parameters related to feedback that can be had are as follows, but are not limited thereto. Some or all of the transmission parameters described below may be indicated. These indicated parameters can be viewed as one set, which is referred to as a measurement/feedback (M/F) parameter set.

3-1) Frequency location to be sensed: Frequency location to be measured when transmitting sensing signal. For example, when an 80 MHz sensing signal is received, it can be measured by indicating Primary 40 or Secondary 40 of 80 MHz.

3-2) Feedback Type: The type of information to be measured and fed back through sensing signal reception (e.g., CSI (channel state information) per subcarrier, CSI per bandwidth, CSI per spatial stream)

The method described above, the method of performing WLAN sensing using parameters, may basically vary depending on the presence or absence of a negotiation phase.

Negotiation phase can be done through exchange by defining a new negotiation frame like ADDBA request/response frame for existing BA (Block Acknowledgment) agreement.

In this specification, a frame transmitted by an STA starting negotiation is referred to as a SENS request frame, and a frame transmitted by an STA responding thereto is referred to as a SENS response frame.

Figure 11:
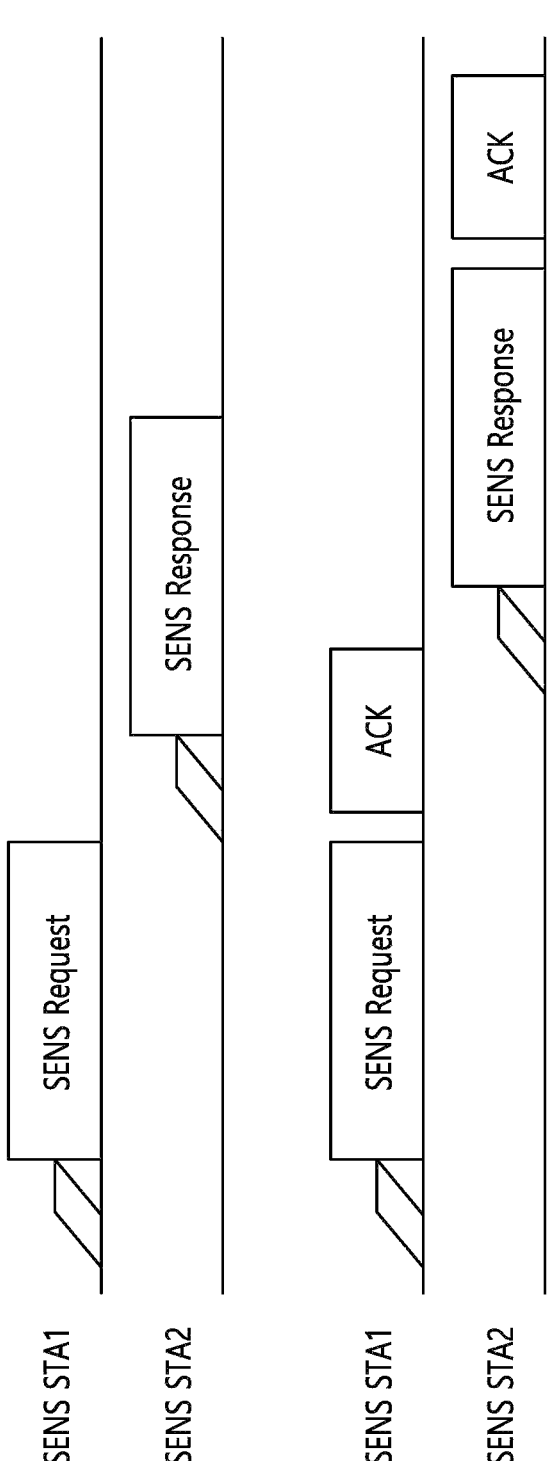
FIG. 11 shows an example of exchange of Basic SENS Request/Response frames.

FIG. 11 shows an example of exchange of Basic SENS Request/Response frames.

As shown in FIG. 11, basically, when SENS STA 1 transmits a SENS Request, SENS STA 2 responds with a SENS Response and conducts negotiation for sensing. In addition, it may respond with ACK for each frame. In addition, if the SENS RPSTA performs processing in SIFS and can respond to negotiation, it may respond with SENS Response after receiving SIFS of SENS Request frame.

The methods described below are explained except for the part that responds with ACK by default and SENS Response transmission after SIFS, and may include response using ACK and SENS Response transmission after SIFS.

Figure 12:
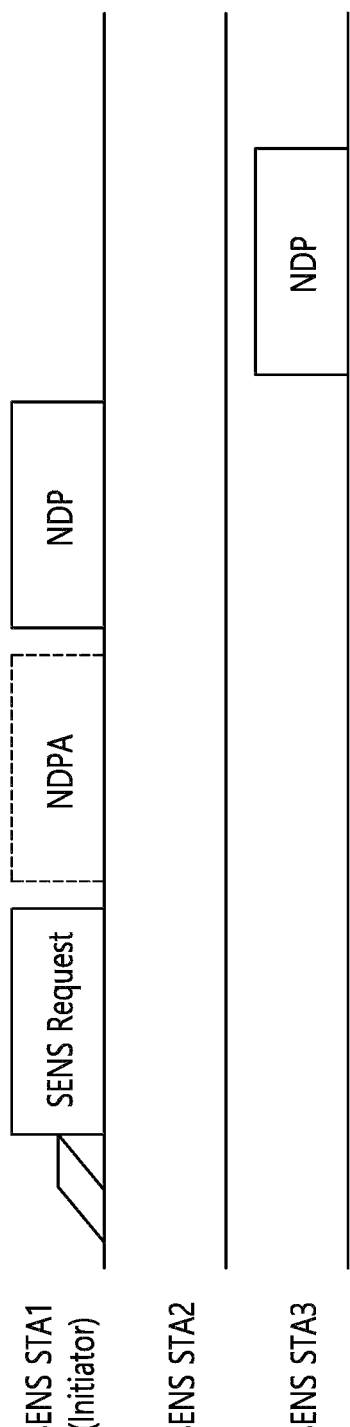
FIG. 12 shows an example of a sensing phase using an explicit method.

FIG. 12 shows an example of a sensing phase using an explicit method.

In the case of the explicit method of the sensing phase, the sensing initiator STA may transmit a request frame before sensing transmitter STAs transmit sensing signals (e.g., NDPA+NDP, NDP only). In FIG. 12, the sensing initiator is STA 1, and the transmitters are STA 1 and STA 3. STA 1 transmits a sensing request frame to request transmission of a sensing signal to STA 1 and STA 3. NDPA may or may not exist.

Although various elements can be negotiated in the Negotiation phase, this specification focuses on the negotiation related to the transmission method and parameters for the Sensing phase described above, that is, scheduling.

1) When Negotiation phase exists: Basically, each phase can perform the following roles.

Setup phase: Notifies the maximum capability for each parameter. That is, there may be indications of whether or not the transmission method suggested above is possible, maximum values related to parameters, and the like.

Negotiation phase: Negotiate transmission method and parameters.

Sensing phase: Transmits and measures sensing signals using negotiated parameters.

Also, below; the sensing transmitter STA is referred to as an ST STA, and the sensing receiver STA is referred to as an SR STA.

Method 1) Provide the transmission method (Explicit or Implicit), one or more Transmit parameter set, and one or more M/F parameter set in SENS Request, and select the transmission method and parameter set in SENS Response.

Basically, the transmit parameter set is included only when transmitting to the sensing transmitter, and the M/F parameter set can be included only when transmitting to the sensing receiver. Considering the case where the role of the receiver can be dynamically changed, both the transmitter and the receiver can transmit the M/F parameter set. In the example below; the case of transmitting all is applied.

Figure 13:
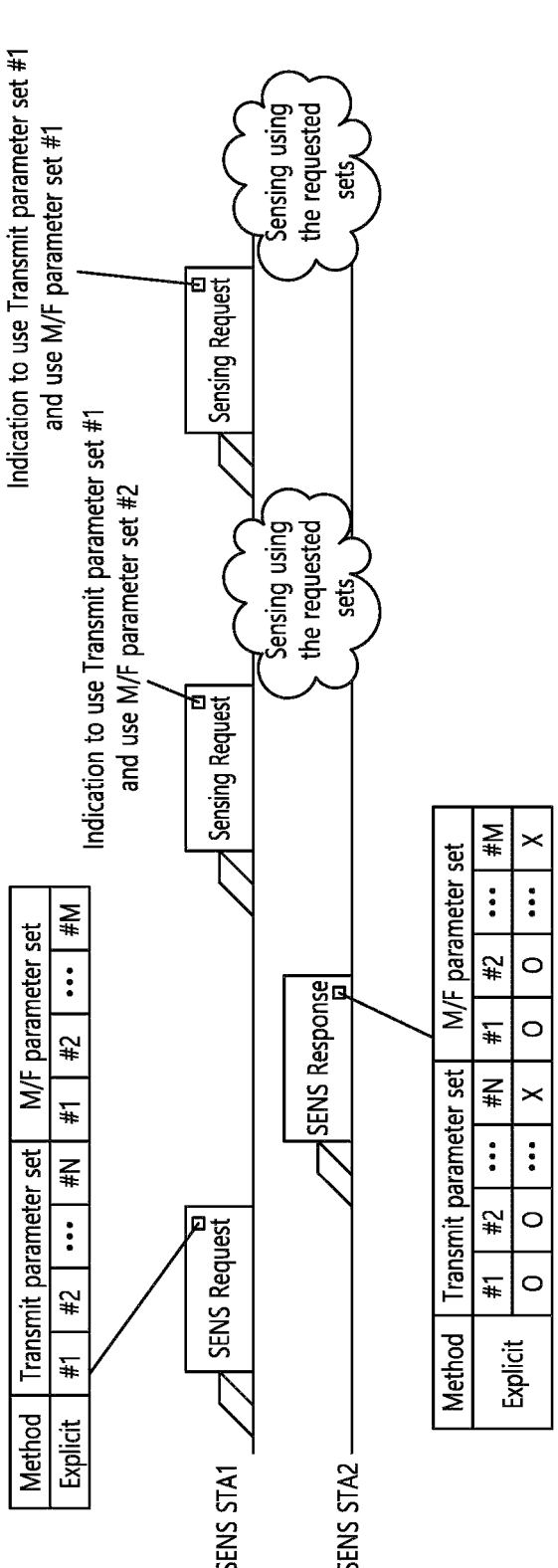
FIG. 13 shows an example in which several parameter sets can be selected in the negotiation phase of method 1.

FIG. 13 shows an example in which several parameter sets can be selected in the negotiation phase of method 1.

In the example of FIG. 13, STA 1 will use the explicit method, and provides N transmit parameter sets and M M/F parameter sets through SENS Request. STA 2 selects transmit parameter sets #1 and #2, and selects M/F parameter sets #1 and #2. If STA 2 only serves as a sensing transmitter, none of the M/F parameter sets may be selected. According to the selection result, STA 1 selects and instructs one of the sets selected by STA 2 when transmitting the sensing request frame. In the first sensing request frame, STA 1 selects transmit parameter #1 and M/F parameter set #2, and STA 1 and STA 2 perform sensing using these parameter sets. In the second sensing request frame, STA 1 selects transmit parameter #1 and M/F parameter set #1, and STA 1 and STA 2 perform sensing using these parameter sets.

In this method, since the parameter set may be different for each STA, the parameter set may be indicated along with the STA ID in the sensing request frame. Therefore, method 1) may have overhead compared to method 2) described later, but it has the advantage that various parameter sets can be used after the negotiation phase.

In the sensing request frame, a dynamic indicator called the same parameter set (e.g., using 1 bit) can be used. For example, if the parameter set is not changed after the first sensing request frame, in the second sensing request frame, if the same parameter set value is 1, the parameter set is not separately indicated, and if the same parameter set value is 0, it is separately indicated.

Figure 14:
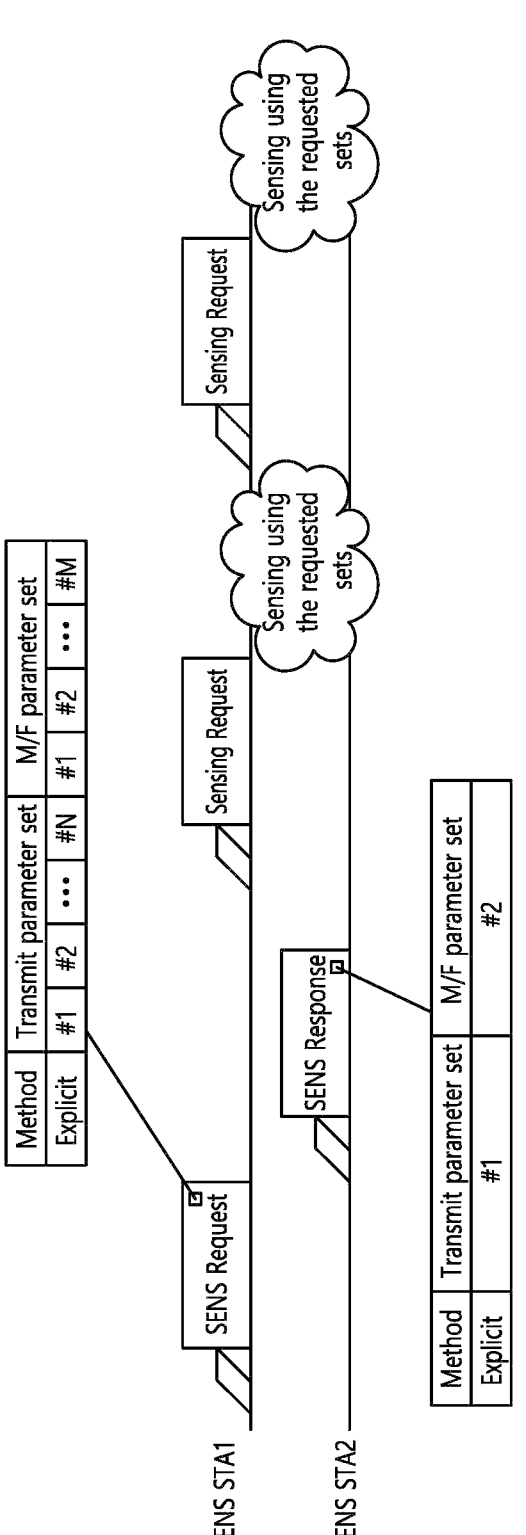
FIG. 14 shows an example in which only one parameter set can be selected in the negotiation phase of method 1.

FIG. 14 shows an example in which only one parameter set can be selected in the negotiation phase of method 1.

In the example of FIG. 14, STA 1 will use the explicit method, and provides N transmit parameter sets and M M/F parameter sets through SENS Request. STA 2 selects transmit parameter set #1 and M/F parameter set #2. If STA 2 only serves as a sensing transmitter, none of the M/F parameter sets may be selected. Since there is only one selected result, STA 1 does not separately include information on parameter set when transmitting the sensing request frame. Therefore, after each sensing request frame, STA 1 and STA 2 perform sensing using this parameter set.

Although the overhead may be less compared to the method of FIG. 13, it has a disadvantage that it is difficult to use various parameter sets after the negotiation phase.

Figure 15:
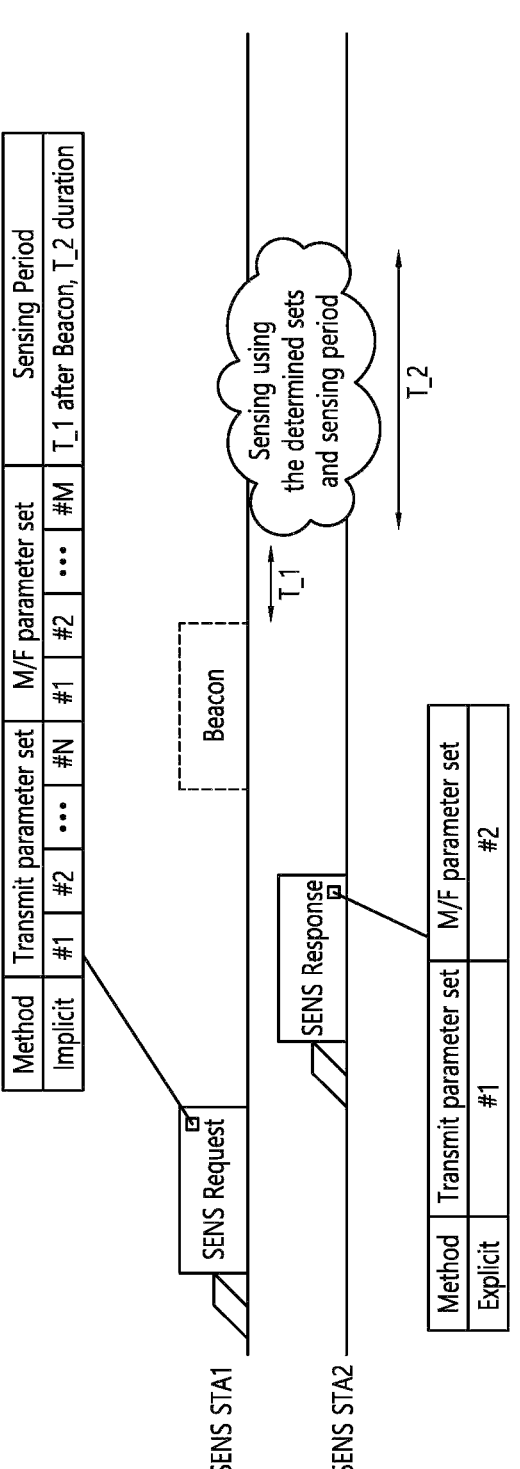
FIG. 15 shows an example of using the implicit method in the Negotiation phase of Method 1.

FIG. 15 shows an example of using the implicit method in the Negotiation phase of Method 1.

In the example of FIG. 15, STA 1 will use the implicit method, and can provide information related to N transmit parameter sets, M M/F parameter sets, and sensing period through SENS Request. For example, in the sensing period, the start of the period after T_1 after the beacon and the duration of the period T_2 may be indicated. STA 2 selects transmit parameter set #1 and M/F parameter set #2. If STA 2 only serves as a sensing transmitter, none of the M/F parameter sets may be selected. STA 1 and STA 2 perform sensing using an implicit method based on the determined parameter set and sensing period.

Method 2) In the SENS Response, the transmission method (Explicit or Implicit), one or more Transmit parameter set, and one or more M/F parameter set can be provided. That is, if a transmission method and role are requested in the SENS Request and what kind of parameter set is required, the sensing responder determines the appropriate parameter set by itself and includes it in the SENS Response.

Figure 16:
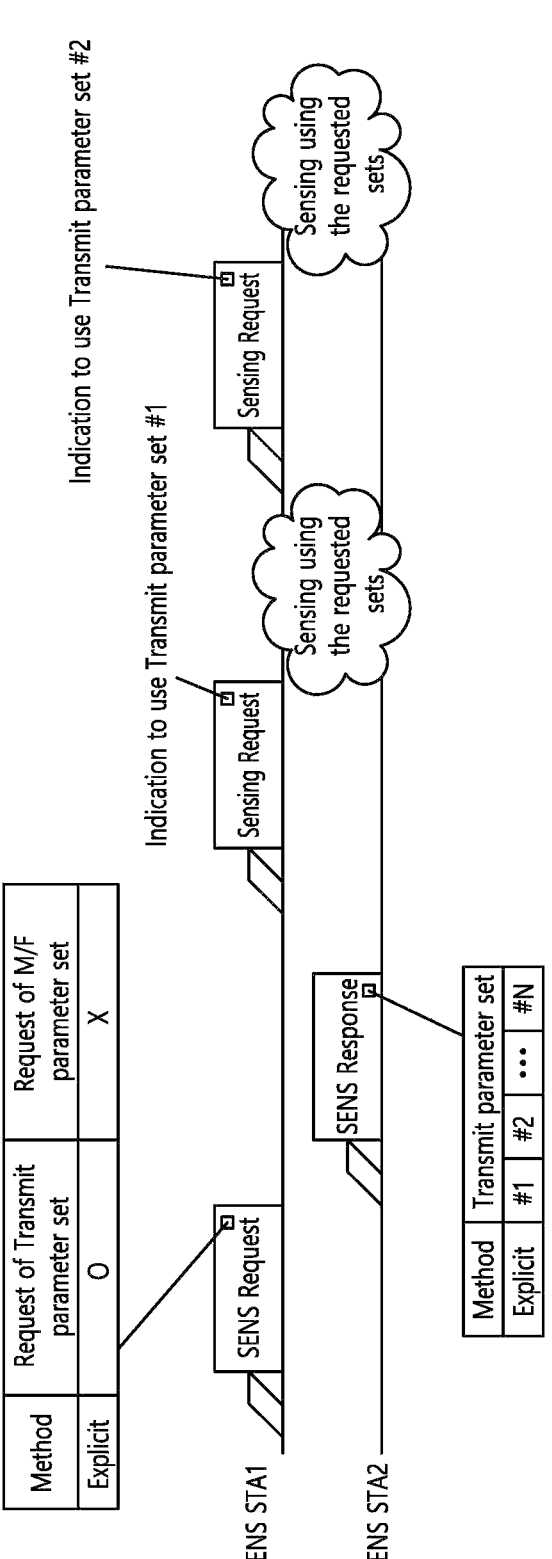
FIG. 16 shows an example of responding by selecting several parameter sets in the Negotiation phase of Method 2.

FIG. 16 shows an example of responding by selecting several parameter sets in the Negotiation phase of Method 2.

The example of FIG. 16 is an example in which STA 1 uses the explicit method and requests a transmit parameter set. Therefore, STA 2 may provide N transmit parameter sets through SENS Response, and M/F parameter sets are not provided because they have not been requested. Therefore, STA 1 selects and instructs one of the sets selected by STA 2 when transmitting the sensing request frame according to the response result. In the first sensing request frame, STA1 selects transmit parameter #1, and STA 2 performs sensing using this parameter set. In the second sensing request frame, STA 1 selects transmit parameter #2, and STA 2 performs sensing using this parameter set.

Figure 17:
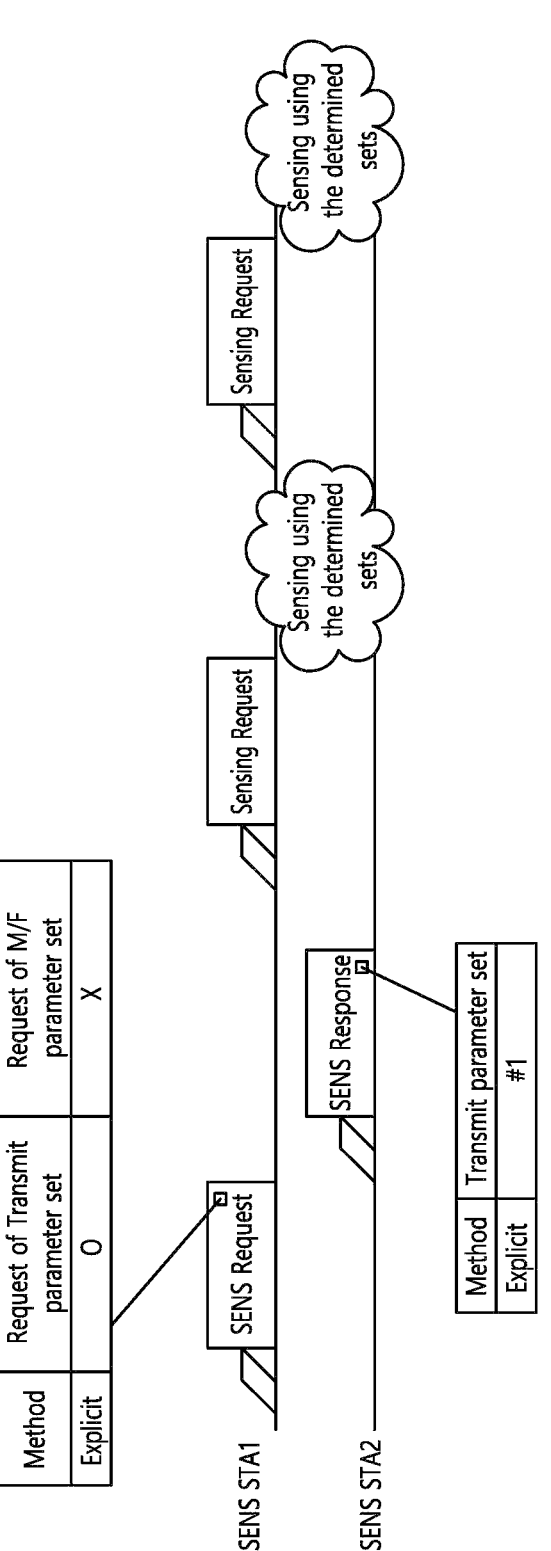
FIG. 17 shows an example of responding by selecting only one parameter set in the negotiation phase of method 2.

FIG. 17 shows an example of responding by selecting only one parameter set in the negotiation phase of method 2.

The example of FIG. 17 is an example in which STA 1 uses the explicit method and requests a transmit parameter set, and STA 2 responds with only one transmit parameter set through SENS Response. Therefore, STA 1 does not separately instruct parameter set when transmitting the sensing request frame according to the response result. STA 2 performs sensing using the transmitted transmit parameter set.

Figure 18:
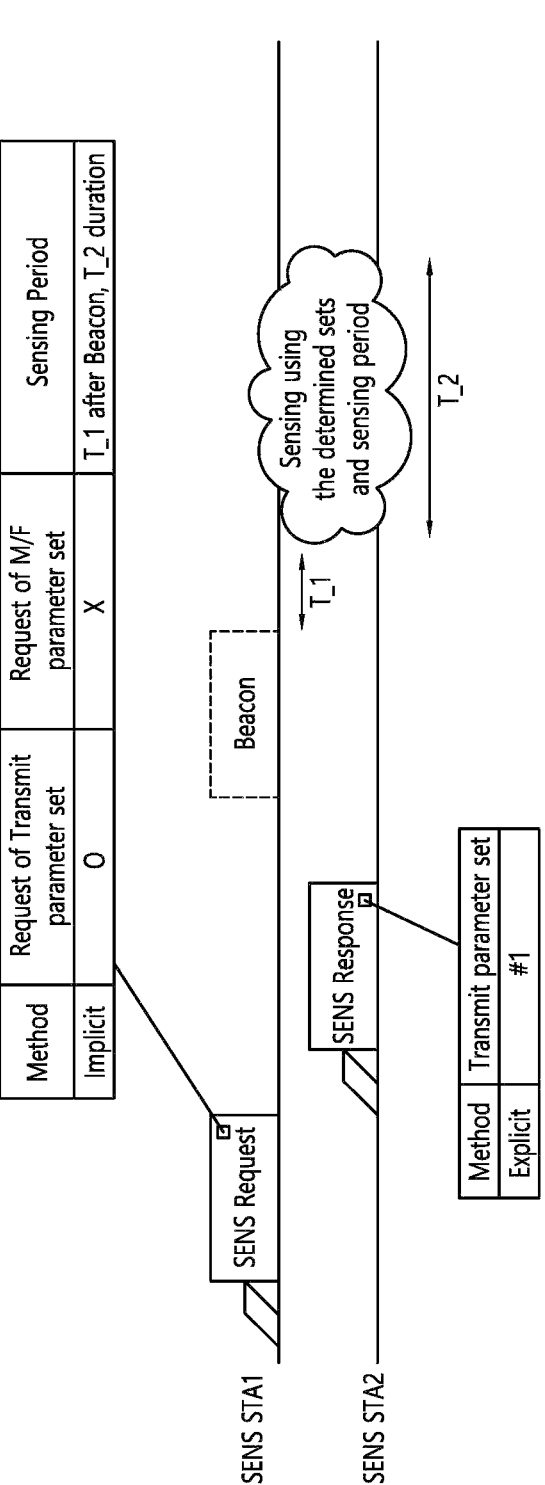
FIG. 18 shows an example using the implicit method in the Negotiation phase of Method 2.

FIG. 18 shows an example using the implicit method in the Negotiation phase of Method 2.

In the example of FIG. 18, STA 1 will use the implicit method, requests a transmit parameter set through a SENS Request, and provides information related to a sensing period. For example, in the sensing period, the start of the period after T_1 after the beacon and the duration of the period T_2 are indicated. STA 2 responds to transmit parameter set #1 through SENS Response and performs sensing within the sensing period using this parameter set.

In this example, STA 1 provided the sensing period, but like the transmit parameter set, it can be requested in SENS Request, and STA 2 can indicate information related to this sensing period in SENS Response.

2) In case the Negotiation phase does not exist or if the above parameter sets are not negotiated in the Negotiation phase: Basically, each phase can perform the following roles.

Method 1) Instruct the transmission method and parameters in the sensing phase, or apply the same procedure in the negotiation phase to the setup phase.

A. As described in the case of 1) Negotiation phase, the maximum capability for each parameter can be announced. There may be instructions on whether or not the transmission method suggested above is possible, maximum values related to parameters, and the like.

In this case, it is necessary to indicate the transmission method and parameters in the sensing phase.

B. 1) Apply the same procedure in the negotiation phase described in the case where the negotiation phase exists to the setup phase. The SENS Request frame is replaced with the Association Request frame, and the SENS Response frame is replaced with the Association Response frame. These methods and examples are the same as the case where the Negotiation phase of 1) exists, and since only frames are replaced, Association Request/Response frame exchange is not separately described.

However, since this method is considered in the setup phase and the AP is always the requesting subject, it is difficult to apply the case requested by the non-AP STA.

Method 2) Sensing Transmitter can indicate transmit parameter set and M/F parameter set in Sensing Request frame or Beacon (when AP initiates). Below; only Sensing Request frame is mentioned, but Sensing Request frame can be replaced with Beacon.

In order to reduce overhead, the Sensing Transmitter (ST STA) may give an indication (e.g., 1 bit each) whether to use the same parameter set as the previously transmitted Sensing Request frame in the next Sensing Request frame. In addition, since all parameters in the parameter set do not change and only a few parameters may change, the sensing transmitter may indicate only the changed parameters rather than all parameters. Therefore, in order to reduce overhead, the sensing transmitter may indicate each parameter through a change present field indicating whether or not each parameter in the parameter set is changed.

Since explicit and implicit methods can be used dynamically, an indicator for explicitness may also be required.

Figure 19:
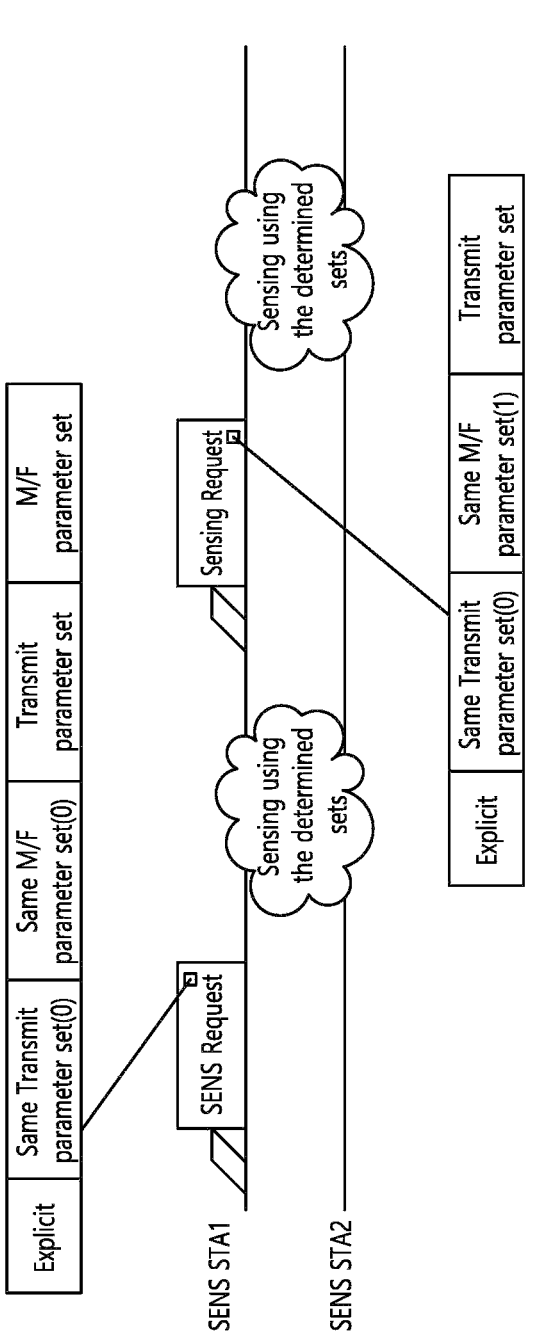
FIG. 19 shows an example of indicating a parameter set through a Sensing Request frame in the Sensing phase of Method 2.

FIG. 19 shows an example of indicating a parameter set through a Sensing Request frame in the Sensing phase of Method 2.

In FIG. 19, STA 1 indicates a transmit parameter set and an M/F parameter set while transmitting a first sensing request frame. When STA 1 transmits the next Sensing Request frame, the Transmit parameter set is changed (Same Transmit parameter set=0), since the M/F parameter set is the same (Same M/F parameter set=1), only the transmit parameter set is separately indicated. For reference, when the Same Transmit parameter set value is 0, this example does not include instructions on whether to change each parameter, but only indicates the entire parameter set.

Method 3) In the case of Implicit, the sensing period set in the setup phase can be used, but otherwise, the sensing request frame or Beacon (when AP initiates) used in Explicit can be used. That is, the sensing transmitter (ST STA) may indicate parameters related to the sensing period in a sensing request frame or beacon. In particular, if a frame such as a beacon is used, periodic sensing can be made possible.

Figure 20:
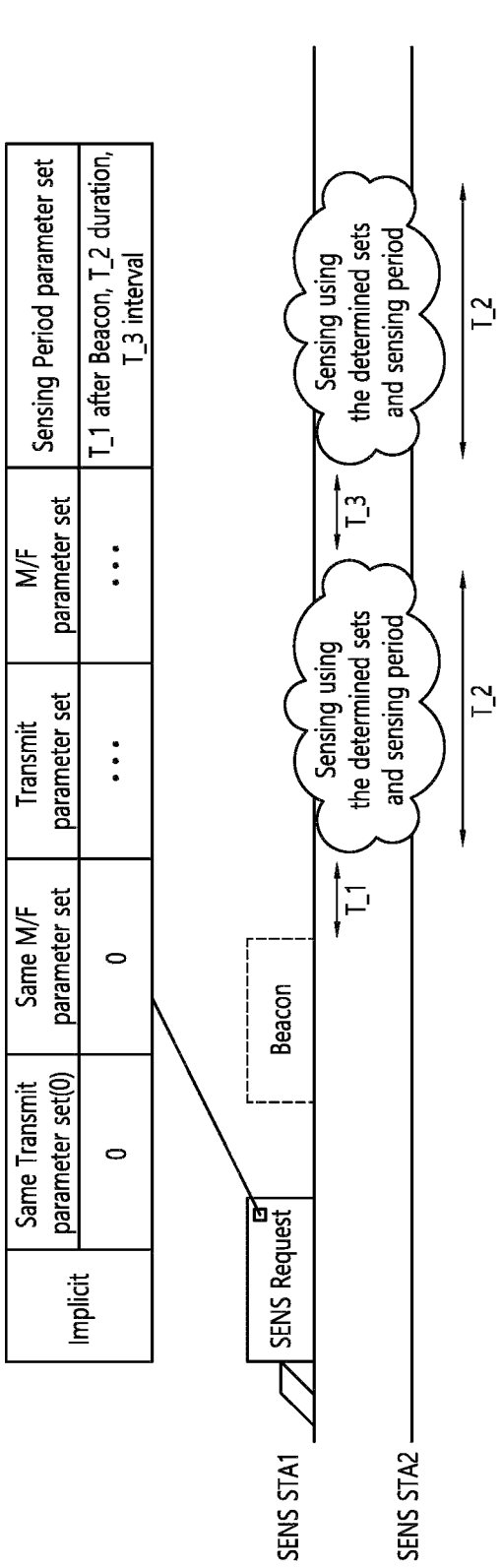
FIG. 20 shows an example using the implicit method when there is no negotiation phase of method 3.

FIG. 20 shows an example using the implicit method when there is no negotiation phase of method 3.

In FIG. 20, STA 1 transmits the first sensing request frame and indicates transmit parameter set, M/F parameter set, and information on the sensing period simultaneously with the explicit method. Therefore, based on this information, STA 1 and STA 2 start the sensing period after beacon reception T_1, perform sensing during T_2, and start the sensing period again after T_3 after the end.

Figure 21:
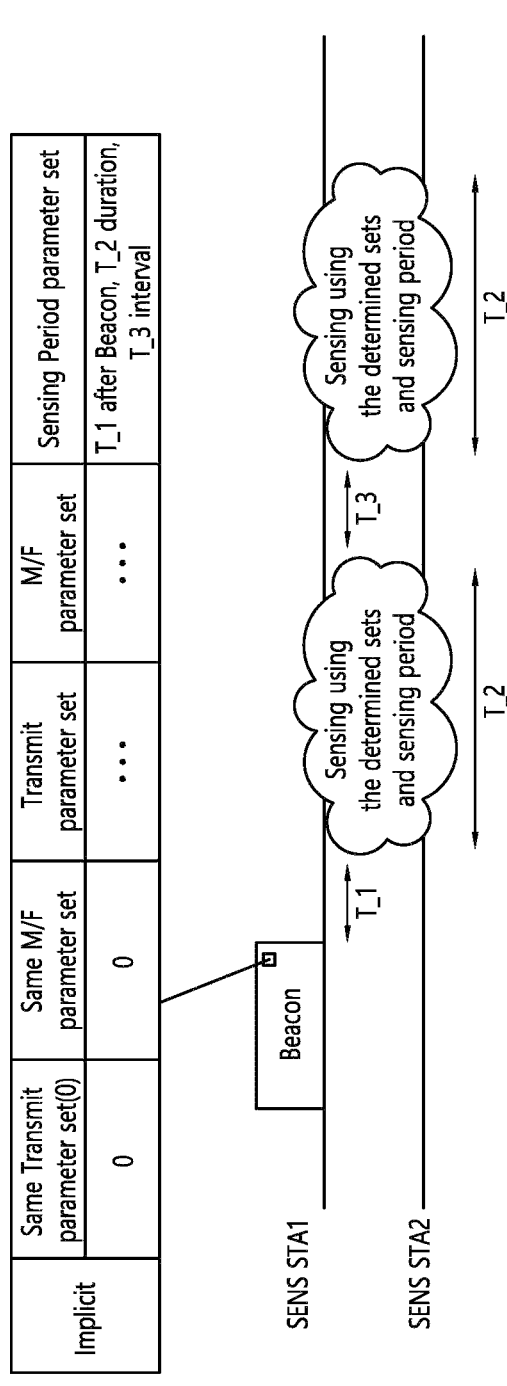
FIG. 21 shows another example using the implicit method when there is no negotiation phase of method 3.

FIG. 21 shows another example using the implicit method when there is no negotiation phase of method 3.

In FIG. 21, STA 1 transmits the first beacon and indicates transmit parameter set, M/F parameter set, and information on the sensing period simultaneously with the explicit method. Therefore, based on this information, STA 1 and STA 2 start the sensing period after beacon reception T_1, perform sensing during T_2, and start the sensing period again after T_3 after the end.

In the Negotiation phase and Sensing phase described above, one STA may initiate sensing. If this STA is an AP (e.g., SENS STA1 is an AP), it can be feasible to the existing Wi-Fi system, but if it is a non-AP STA (e.g., SENS STA1 is a non-AP STA), P2P transmission (i.e., non-Transmission between AP STAs) may occur. Therefore, there may be additional methods to avoid P2P transmission, such as:

When the non-AP STA performs sensing initiation, the non-AP STA may transmit a query frame (Sensing Query) enabling the AP to perform sensing initiation instead. Therefore, the AP receiving this query frame responds with the final result (e.g., measurement results) to this non-AP STA. This process can be performed with one TXOP or multiple TXOPs from query to response.

Figure 22:
FIG. 22 shows an example in which a non-AP STA performs sensing initiation.

FIG. 22 shows an example in which a non-AP STA performs sensing initiation.

As shown in FIG. 22, a non-AP STA requests the AP to control WLAN sensing through a sensing query. In the embodiment described above except for FIG. 22, the AP serves as SENS STA 1, but in FIG. 22, the non-AP STA serves as SENS STA 1.

This sensing query frame may have the same contents as the SENS Request in FIG. 11, that is, contents for a role/parameter to be negotiated, and may additionally have parameters to be used in the sensing phase described above. Therefore, the sensing query frame may be set to one or another type of SENS Request frame. The AP responding to this query goes through a negotiation phase and a sensing phase, and responds to the finally obtained sensing results to the STA 2 (AP). Similarly, the response for sensing result frame may be set as another type of SENS Response frame.

3) Dynamic Indication

As mentioned in various information related to roles and parameters, the parameters to request may vary depending on the role. Therefore, a dynamic instruction method may be needed to reduce overhead rather than including all request parameters in one request frame, and is as follows.

A. Determination of Inclusion According to Role (Implicit Method)

Depending on the role of the sensing responder, whether to include a related parameter set can be determined. For example, if the role of the sensing responder is a receiver, only the M/F Parameter Set is included except for the Transmit Parameter Set. Conversely, if the role of the sensing responder is a transmitter, the above transmit parameter set is included and the M/F parameter set is not included.

B. Determination of Inclusion Through Explicit Indication

The presence field for each parameter set is included first. That is, whether to include the Transmit Parameter Set subfield is determined by including the Transmit Parameter Set Present subfield, and similarly, whether to include the M/F Parameter Set subfield is determined by including the M/F Parameter Set Present subfield.

Hereinafter, the above-described embodiment will be described with reference to FIGS. 1 to 22.

Figure 23:
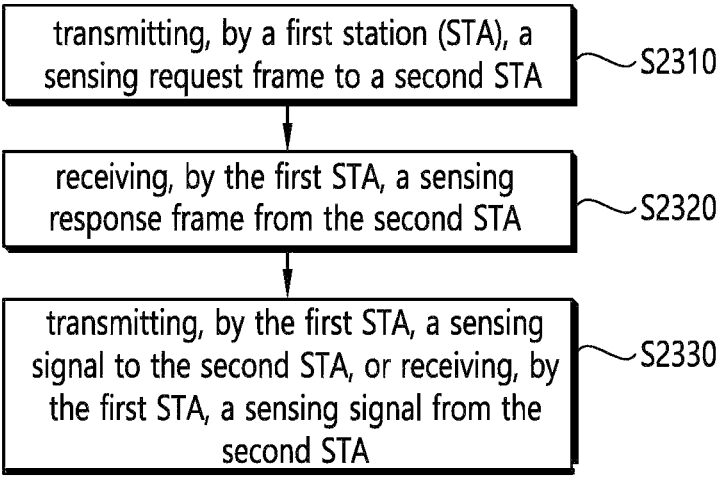
FIG. 23 is a flowchart illustrating a procedure in which a sensing initiator performs sensing according to the present embodiment.

FIG. 23 is a flowchart illustrating a procedure in which a sensing initiator performs sensing according to the present embodiment.

The example of FIG. 23 may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

The example of FIG. 23 is performed in a first STA, and the first STA may correspond to a sensing initiator. The second and third STAs of FIG. 23 may correspond to sensing responders.

This embodiment proposes a method for determining STAs to participate in sensing in a WLAN system, negotiating parameters to be used for sensing, and performing a sensing procedure based on the negotiated parameters. In particular, this embodiment proposes a method of performing a sensing procedure based on role negotiation, parameter negotiation in the negotiation step, and selected parameters.

In step S2310, the first STA (station) transmits a sensing request frame to a second STA.

In step S2320, the first STA receives a sensing response frame from the second STA.

In step S2330, the first STA transmits a sensing signal to the second STA or receives a sensing signal from the second STA.

The sensing request frame includes a transmission method of the sensing signal, a transmission parameter set, and a measurement and feedback parameter set. The sensing response frame includes a first indicator for whether or not at least one transmission parameter included in the transmission parameter set is used, and a second indicator indicating whether at least one measurement and feedback parameter included in the measurement and feedback parameter set is used. For example, the second STA may indicate through the sensing response frame that two transmission parameters may be used in the transmission parameter set, and may indicate that three measurement and feedback parameters may be used in the measurement and feedback parameter set. According to the operation proposed in this embodiment, it has a new effect that a sensing procedure can be performed based on various parameter sets while minimizing overhead between sensing STAs.

The first and second indicators may be composed of bitmaps. That is, the first indicator may be a bitmap composed of bits indicating whether to use each parameter included in the transmission parameter set. The second indicator may be a bitmap composed of bits indicating whether to use each parameter included in the measurement and feedback parameter set.

However, when the first indicator indicates that the at least one transmission parameter is not used, the sensing response frame may include a recommended transmission parameter other than the at least one transmission parameter. When the second indicator indicates that the at least one measurement and feedback parameter is not used, the sensing response frame may include a recommended measurement and feedback parameter other than the at least one measurement and feedback parameter. For example, when the second STA determines that a specific transmission parameter is not used in the transmission parameter set, the second STA may recommend another transmission parameter to the first STA through the sensing response frame instead of the specific transmission parameter. When the second STA determines that a specific measurement and feedback parameter is not used in the measurement and feedback parameter set, the second STA may recommend another measurement and feedback parameter to the first STA through the sensing response frame instead of the specific measurement and feedback parameter.

When the transmission method of the sensing signal is set to an explicit method, the first STA may transmit a sensing initiation frame to the second STA. In addition, the first STA may receive channel information measured based on the sensing signal from the second STA or perform channel measurement based on the sensing signal. The sensing initiation frame may include information on sensing roles of the first and second STAs. The information on the sensing roles of the first and second STAs may include information on whether the first and second STAs are transmitters for transmitting the sensing signal or receivers for receiving the sensing signal. For example, when the first STA is the transmitting end and the second STA is the receiving end, the first STA may transmit the sensing signal to the second STA, and may receive channel information measured based on the sensing signal from the second STA.

The sensing initiation frame may further include first and second parameters. The first parameter may be selected from the at least one transmission parameter by the first or second STA. The second parameter may be selected from the at least one measurement and feedback parameter by the first or second STA. The sensing signal may be transmitted and received based on the first and second parameters.

When the transmission method of the sensing signal is set to an implicit method, the first STA may transmit a beacon frame to the second STA. In addition, the first STA may receive channel information measured based on the sensing signal from the second STA or perform channel measurement based on the sensing signal. The sensing signal may be transmitted and received based on the beacon frame, the at least one transmission parameter, and the at least one measurement and feedback parameter. When the transmission method of the sensing signal is an implicit method, since a sensing session initiates without transmitting a separate sensing initiation frame, the sensing signal can be transmitted and received based on the beacon frame.

Specifically, the sensing request frame may further include sensing period information. The sensing period information may include information on a time when the sensing signal is first transmitted, information on a time interval of one session in which the sensing signal is transmitted, and information on a time interval between an end time of one session in which the sensing signal is transmitted and a start time of the next session in which the sensing signal is transmitted. The time when the sensing signal is first transmitted may be set after a predetermined time elapses after the beacon frame is transmitted.

The sensing signal may include a Null Data Packet Announcement (NDPA) and a NDP, or may include only a NDP. The NDPA may always be transmitted before the NDP.

The transmission parameter set may include information on a number of antennas or spatial streams used to transmit the sensing signal, a type of the sensing signal, a length of the sensing signal, a measurable bandwidth through which the sensing signal is transmitted, a number of transmissions of the sensing signal, and a parameter of the sensing period. The measurement and feedback parameter set may include information on a frequency position to be measured based on the sensing signal and a type of information to be measured and fed back based on the sensing signal.

If the second STA is a non-AP STA performing sensing initiation, the first STA may receive a sensing query frame from the second STA. The first STA may transmit an ACK for the sensing query frame to the second STA. The sensing query frame may include information allowing the second STA to control the sensing initiation to the first STA.

After the first STA terminates a sensing procedure with the second STA, the first STA may transmit a response message for a sensing result to the second STA. The first STA may receive an ACK for the response message from the second STA.

A procedure for wireless sensing may largely include a setup phase, a negotiation phase, a sensing phase, and a tear down phase. Each step may be performed in the order described, and may be repeated several times in one cycle period. The sensing step may include at least one sensing session.

In the negotiation step, the sensing request frame and the first and second sensing response frames may be exchanged. In the sensing step, the sensing signal may be transmitted, and channel measurement may be performed based on the sensing signal. The sensing step may be torn down when there is no exchange of frames for a predetermined time. In the tear down step, negotiated parameter information is reset, and all sensing sessions in the sensing step may be terminated. In order to initiate the sensing session again, the negotiation phase has to go through again.

Figure 24:
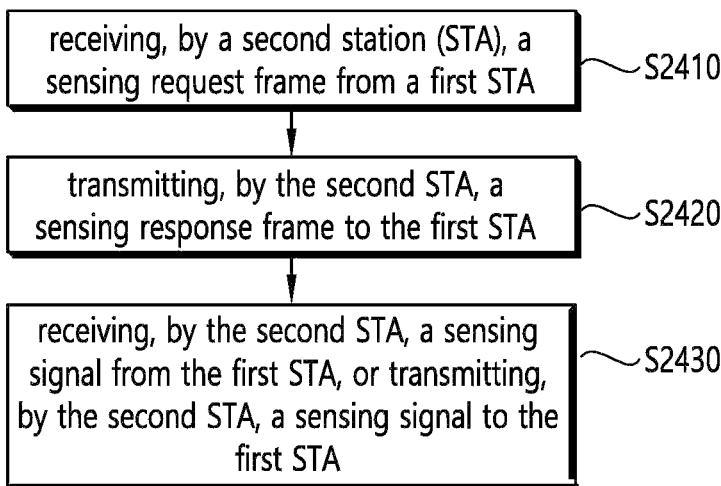
FIG. 24 is a flowchart illustrating a procedure in which a sensing responder performs sensing according to the present embodiment.

FIG. 24 is a flowchart illustrating a procedure in which a sensing responder performs sensing according to the present embodiment.

The example of FIG. 24 may be performed in a network environment in which a next-generation wireless LAN system (IEEE 802.11bf) is supported. The next-generation wireless LAN system is a wireless LAN system improved from 802.11ad and 802.11ay systems, and may satisfy backward compatibility with 802.11ad and 802.11ay systems.

The example of FIG. 24 is performed in a second STA, and the second STA may correspond to a sensing responder. The first STA of FIG. 24 may correspond to a sensing initiator. The third STA of FIG. 24 may also correspond to the sensing responder.

This embodiment proposes a method for determining STAs to participate in sensing in a WLAN system, negotiating parameters to be used for sensing, and performing a sensing procedure based on the negotiated parameters. In particular, this embodiment proposes a method of performing a sensing procedure based on role negotiation, parameter negotiation in the negotiation step, and selected parameters.

In step S2410, the second STA (station) receives a sensing request frame from a first STA.

In step S2420, the second STA transmits a sensing response frame to the first STA.

In step S2430, the second STA receives a sensing signal from the first STA or transmits a sensing signal to the first STA.

The sensing request frame includes a transmission method of the sensing signal, a transmission parameter set, and a measurement and feedback parameter set. The sensing response frame includes a first indicator for whether or not at least one transmission parameter included in the transmission parameter set is used, and a second indicator indicating whether at least one measurement and feedback parameter included in the measurement and feedback parameter set is used. For example, the second STA may indicate through the sensing response frame that two transmission parameters may be used in the transmission parameter set, and may indicate that three measurement and feedback parameters may be used in the measurement and feedback parameter set. According to the operation proposed in this embodiment, it has a new effect that a sensing procedure can be performed based on various parameter sets while minimizing overhead between sensing STAs.

The first and second indicators may be composed of bitmaps. That is, the first indicator may be a bitmap composed of bits indicating whether to use each parameter included in the transmission parameter set. The second indicator may be a bitmap composed of bits indicating whether to use each parameter included in the measurement and feedback parameter set.

However, when the first indicator indicates that the at least one transmission parameter is not used, the sensing response frame may include a recommended transmission parameter other than the at least one transmission parameter. When the second indicator indicates that the at least one measurement and feedback parameter is not used, the sensing response frame may include a recommended measurement and feedback parameter other than the at least one measurement and feedback parameter. For example, when the second STA determines that a specific transmission parameter is not used in the transmission parameter set, the second STA may recommend another transmission parameter to the first STA through the sensing response frame instead of the specific transmission parameter. When the second STA determines that a specific measurement and feedback parameter is not used in the measurement and feedback parameter set, the second STA may recommend another measurement and feedback parameter to the first STA through the sensing response frame instead of the specific measurement and feedback parameter.

When the transmission method of the sensing signal is set to an explicit method, the second STA may receive a sensing initiation frame from the first STA. In addition, the second STA may receive channel information measured based on the sensing signal from the first STA or perform channel measurement based on the sensing signal. The sensing initiation frame may include information on sensing roles of the first and second STAs. The information on the sensing roles of the first and second STAs may include information on whether the first and second STAs are transmitters for transmitting the sensing signal or receivers for receiving the sensing signal. For example, when the first STA is the transmitting end and the second STA is the receiving end, the first STA may transmit the sensing signal to the second STA, and may receive channel information measured based on the sensing signal from the second STA.

The sensing initiation frame may further include first and second parameters. The first parameter may be selected from the at least one transmission parameter by the first or second STA. The second parameter may be selected from the at least one measurement and feedback parameter by the first or second STA. The sensing signal may be transmitted and received based on the first and second parameters.

When the transmission method of the sensing signal is set to an implicit method, the second STA may receive a beacon frame from the first STA. In addition, the second STA may receive channel information measured based on the sensing signal from the first STA or perform channel measurement based on the sensing signal. The sensing signal may be transmitted and received based on the beacon frame, the at least one transmission parameter, and the at least one measurement and feedback parameter. When the transmission method of the sensing signal is an implicit method, since a sensing session initiates without transmitting a separate sensing initiation frame, the sensing signal can be transmitted and received based on the beacon frame.

Specifically, the sensing request frame may further include sensing period information. The sensing period information may include information on a time when the sensing signal is first transmitted, information on a time interval of one session in which the sensing signal is transmitted, and information on a time interval between an end time of one session in which the sensing signal is transmitted and a start time of the next session in which the sensing signal is transmitted. The time when the sensing signal is first transmitted may be set after a predetermined time elapses after the beacon frame is transmitted.

The sensing signal may include a Null Data Packet Announcement (NDPA) and a NDP, or may include only a NDP. The NDPA may always be transmitted before the NDP.

The transmission parameter set may include information on a number of antennas or spatial streams used to transmit the sensing signal, a type of the sensing signal, a length of the sensing signal, a measurable bandwidth through which the sensing signal is transmitted, a number of transmissions of the sensing signal, and a parameter of the sensing period. The measurement and feedback parameter set may include information on a frequency position to be measured based on the sensing signal and a type of information to be measured and fed back based on the sensing signal.

If the second STA is a non-AP STA performing sensing initiation, the second STA may transmit a sensing query frame to the first STA. The second STA may receive an ACK for the sensing query frame from the first STA. The sensing query frame may include information allowing the second STA to control the sensing initiation to the first STA.

After the first STA terminates a sensing procedure with the second STA, the second STA may receive a response message for a sensing result from the first STA. The second STA may transmit an ACK for the response message to the second STA.

A procedure for wireless sensing may largely include a setup phase, a negotiation phase, a sensing phase, and a tear down phase. Each step may be performed in the order described, and may be repeated several times in one cycle period. The sensing step may include at least one sensing session.

In the negotiation step, the sensing request frame and the first and second sensing response frames may be exchanged. In the sensing step, the sensing signal may be transmitted, and channel measurement may be performed based on the sensing signal. The sensing step may be torn down when there is no exchange of frames for a predetermined time. In the tear down step, negotiated parameter information is reset, and all sensing sessions in the sensing step may be terminated. In order to initiate the sensing session again, the negotiation phase has to go through again.

The technical features of the present disclosure may be applied to various devices and methods. For example, the technical features of the present disclosure may be performed/supported through the device(s) of FIG. 1 and/or FIG. 8. For example, the technical features of the present disclosure may be applied to only part of FIG. 1 and/or FIG. 8. For example, the device according to the present disclosure transmit a sensing request frame to a second station (STA): receive a sensing response frame from the second STA; and transmit a sensing signal to the second STA, or receive a sensing signal from the second STA.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including transmitting a sensing request frame to a second station (STA): receiving a sensing response frame from the second STA; and transmitting a sensing signal to the second STA, or receiving a sensing signal from the second STA. The instructions stored in the CRM of the present specification may be executed by at least one processor. The CRM in the present specification may be a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

transmitting, by a first station (STA), a sensing request frame to a second STA;

receiving, by the first STA, a sensing response frame from the second STA; and transmitting, by the first STA, a first sensing signal to the second STA, or receiving, by the first STA, a second sensing signal from the second STA, wherein the sensing request frame includes a transmission method of the first sensing signal or the second sensing signal, a transmission parameter set, and a measurement and feedback parameter set, wherein the sensing response frame includes a first indicator for whether or not at least one transmission parameter included in the transmission parameter set is used, and a second indicator for whether or not at least one measurement and feedback parameter included in the measurement and feedback parameter set is used, based on the transmission method of the first sensing signal or the second sensing signal being set to an explicit method, transmitting, by the first STA, a sensing initiation frame to the second STA after the first STA receives the sensing response frame; and receiving, by the first STA, channel information measured based on the first sensing signal from the second STA or performing, by the first STA, channel measurement based on the second sensing signal, wherein the sensing initiation frame includes information on sensing roles of the first and second STAs, wherein the information on the sensing roles of the first and second STAs includes information on whether the first STA is a transmitter for transmitting the first sensing signal and whether the first STA is a receiver for receiving the second sensing signal, wherein the sensing initiation frame further includes first and second parameters, wherein the first parameter is selected from the at least one transmission parameter by the first or second STA, wherein the second parameter is selected from the at least one measurement and feedback parameter by the first or second STA, and wherein the first sensing signal is transmitted based on the first and second parameters, or the second sensing signal is received based on the first and second parameters.

2. The method of claim 1, further comprising:

based on the transmission method of the first sensing signal or the second sensing signal being set to an implicit method, transmitting, by the first STA, a beacon frame to the second STA after the first STA receives the sensing response frame; and receiving, by the first STA, channel information measured based on the first sensing signal from the second STA or performing, by the first STA, channel measurement based on the second sensing signal, wherein the first sensing signal is transmitted and the second sensing signal is received based on the beacon frame, the at least one transmission parameter, and the at least one measurement and feedback parameter.

3. The method of claim 1, wherein the sensing request frame further includes sensing period information, wherein the sensing period information includes information on a time when the first sensing signal or the second sensing signal is first transmitted, information on a time interval of one session in which the first sensing signal or the second sensing signal is transmitted, and information on a time interval between an end time of one session in which the first sensing signal or the second sensing signal is transmitted and a start time of the next session in which the first sensing signal or the second sensing signal is transmitted, wherein the time when the first sensing signal or the second sensing signal is first transmitted is set after a predetermined time elapses after a beacon frame is transmitted.

4. The method of claim 1, wherein the first sensing signal or the second sensing signal includes a Null Data Packet Announcement (NDPA) and an NDP, or includes only the NDP.

5. The method of claim 1, wherein based on the first indicator indicating that the at least one transmission parameter is not used, the sensing response frame includes a recommended transmission parameter other than the at least one transmission parameter, wherein based on the second indicator indicating that the at least one measurement and feedback parameter is not used, the sensing response frame includes a recommended measurement and feedback parameter other than the at least one measurement and feedback parameter, wherein the transmission parameter set includes information on a number of antennas or spatial streams used to transmit the first sensing signal or the second sensing signal, a type of the first sensing signal or the second sensing signal, a length of the first sensing signal or the second sensing signal, a measurable bandwidth through which the first sensing signal or the second sensing signal is transmitted, a number of transmissions of the first sensing signal or the second sensing signal, and a parameter of a sensing period, wherein the measurement and feedback parameter set includes information on a frequency position to be measured based on the first sensing signal or the second sensing signal and a type of information to be measured and fed back based on the first sensing signal or the second sensing signal.

6. The method of claim 1, further comprising:

based on the second STA being a non-Access Point (non-AP) STA performing sensing initiation, receiving, by the first STA, a sensing query frame from the second STA; and transmitting, by the first STA, a first Acknowledgment (ACK) frame for the sensing query frame to the second STA, wherein the sensing query frame includes information allowing the second STA to control the sensing initiation to the first STA.

7. The method of claim 1, further comprising:

after the first STA terminates a sensing procedure with the second STA, transmitting, by the first STA, a response message for a sensing result to the second STA; and receiving, by the first STA, a second ACK frame for the response message from the second STA.

8. A first station (STA) in a wireless local area network (WLAN) system, the first STA comprising:

a memory;

a transceiver; and a processor being operatively connected to the memory and the transceiver, wherein the processor is configured to:

transmit a sensing request frame to a second STA;

receive a sensing response frame from the second STA; and transmit a first sensing signal to the second STA, or receive a second sensing signal from the second STA, wherein the sensing request frame includes a transmission method of the first sensing signal or the second sensing signal, a transmission parameter set, and a measurement and feedback parameter set, wherein the sensing response frame includes a first indicator for whether or not at least one transmission parameter included in the transmission parameter set is used, and a second indicator for whether or not at least one measurement and feedback parameter included in the measurement and feedback parameter set is used, based on the transmission method of the first sensing signal or the second sensing signal being set to an explicit method, the processor is further configured to transmit a sensing initiation frame to the second STA after the first STA receives the sensing response frame; and receive channel information measured based on the first sensing signal from the second STA or perform channel measurement based on the second sensing signal, wherein the sensing initiation frame includes information on sensing roles of the first and second STAs, wherein the information on the sensing roles of the first and second STAs includes information on whether the first STA is a transmitter for transmitting the first sensing signal and whether the first STA is a receiver for receiving the second sensing signal, wherein the sensing initiation frame further includes first and second parameters, wherein the first parameter is selected from the at least one transmission parameter by the first or second STA, wherein the second parameter is selected from the at least one measurement and feedback parameter by the first or second STA, and wherein the first sensing signal is transmitted based on the first and second parameters, or the second sensing signal is received based on the first and second parameters.

9. A method in a wireless local area network (WLAN) system, the method comprising:

receiving, by a second station (STA), a sensing request frame from a first STA;

transmitting, by the second STA, a sensing response frame to the first STA; and receiving, by the second STA, a first sensing signal from the first STA, or transmitting, by the second STA, a second sensing signal to the first STA, wherein the sensing request frame includes a transmission method of the first sensing signal or the second sensing signal, a transmission parameter set, and a measurement and feedback parameter set, wherein the sensing response frame includes a first indicator for whether or not at least one transmission parameter included in the transmission parameter set is used, and a second indicator for whether or not at least one measurement and feedback parameter included in the measurement and feedback parameter set is used, based on the transmission method of the first sensing signal or the second sensing signal being set to an explicit method, receiving, by the second STA, a sensing initiation frame from the first STA after the second STA transmits the sensing response frame; and performing, by the second STA, channel measurement based on the first sensing signal and transmitting, by the second STA, channel information measured based on the first sensing signal to the first STA, when the second STA receives the first sensing signal, wherein the sensing initiation frame includes information on sensing roles of the first and second STAs, wherein the information on the sensing roles of the first and second STAs includes information on whether the first STA is a transmitter for transmitting the first sensing signal and whether the first STA is a receiver for receiving the second sensing signal, wherein the sensing initiation frame further includes first and second parameters, wherein the first parameter is selected from the at least one transmission parameter by the first or second STA, wherein the second parameter is selected from the at least one measurement and feedback parameter by the first and second STA, and wherein the first sensing signal is transmitted based on the first and second parameters, or the second sensing signal is received based on the first and second parameters.

10. The method of claim 9, wherein the sensing initiation frame further includes information on sensing roles of the first and second STAs, wherein the information on the sensing roles of the first and second STAs includes information on whether the first STA is a transmitter for transmitting the first sensing signal and whether the second STA is a receiver for receiving the second sensing signal.

11. The method of claim 9, further comprising:

based on the transmission method of the first sensing signal or the second sensing signal being set to an implicit method, receiving, by the second STA, a beacon frame from the first STA after the second STA transmits the sensing response frame; and performing, by the second STA, channel measurement based on the first sensing signal and transmitting, by the second STA, channel information measured based on the first sensing signal to the first STA, when the second STA receives the first sensing signal, wherein the first sensing signal is transmitted and the second sensing signal is received based on the beacon frame, the at least one transmission parameter, and the at least one measurement and feedback parameter.

12. The method of claim 9, wherein the sensing request frame further includes sensing period information, wherein the sensing period information includes information on a time when the first sensing signal or the second sensing signal is first transmitted, information on a time interval of one session in which the first sensing signal or the second sensing signal is transmitted, and information on a time interval between an end time of one session in which the first sensing signal or the second sensing signal is transmitted and a start time of the next session in which the first sensing signal or the second sensing signal is transmitted, wherein the time when the first sensing signal or the second sensing signal is first transmitted is set after a predetermined time elapses after a beacon frame is transmitted.

13. The method of claim 9, wherein the first sensing signal or the second sensing signal includes a Null Data Packet Announcement (NDPA) and an NDP, or includes only the NDP.

14. The method of claim 9, wherein based on the first indicator indicating that the at least one transmission parameter is not used, the sensing response frame includes a recommended transmission parameter other than the at least one transmission parameter, wherein based on the second indicator indicating that the at least one measurement and feedback parameter is not used, the sensing response frame includes a recommended measurement and feedback parameter other than the at least one measurement and feedback parameter, wherein the transmission parameter set includes information on a number of antennas or spatial streams used to transmit the first sensing signal or the second sensing signal, a type of the first sensing signal or the second sensing signal, a length of the first sensing signal or the second sensing signal, a measurable bandwidth through which the first sensing signal or the second sensing signal is transmitted, a number of transmissions of the first sensing signal or the second sensing signal, and a parameter of a sensing period, wherein the measurement and feedback parameter set includes information on a frequency position to be measured based on the first sensing signal or the second sensing signal and a type of information to be measured and fed back based on the first sensing signal or the second sensing signal.

\* \* \* \* \*